(12) United States Patent
Pedersen

(10) Patent No.: US 7,037,426 B2
(45) Date of Patent: May 2, 2006

(54) IMMERSED MEMBRANE APPARATUS

(75) Inventor: Steven Pedersen, Burlington (CA)

(73) Assignee: ZENON Environmental Inc., Oakville (CA)

( * ) Notice: Subject to any disclaimer, the term of this patent is extended or adjusted under 35 U.S.C. 154(b) by 343 days.

(21) Appl. No.: 10/146,934

(22) Filed: May 17, 2002

(65) Prior Publication Data

US 2002/0179517 A1 Dec. 5, 2002

Related U.S. Application Data

(63) Continuation-in-part of application No. 09/889,352, filed as application No. PCT/CA00/01359 on Nov. 15, 2000.

(30) Foreign Application Priority Data

May 18, 2001 (CA) .............................. 2348186

(51) Int. Cl.
B01D 63/00 (2006.01)

(52) U.S. Cl. ............... 210/321.8; 210/636; 210/500.23; 210/257.2

(58) Field of Classification Search ............... 210/321.8, 210/321.89, 636, 500.23, 257.2
See application file for complete search history.

(56) References Cited

U.S. PATENT DOCUMENTS

| 5,034,125 | A | 7/1991 | Karbachsch et al. |
| 5,192,456 | A | 3/1993 | Ishida et al. |
| 5,230,796 | A | 7/1993 | Ter Meulen |
| 5,248,424 | A | 9/1993 | Cote et al. |

(Continued)

FOREIGN PATENT DOCUMENTS

| EP | 0598909 | 1/1998 |
| EP | 0931582 | 7/1999 |

(Continued)

OTHER PUBLICATIONS

Suda, K. et al. "Development of a tank–submerged bype membrane filtration system", Jun. 1998, P. 151–158.
Technical Drawings of ZW500C RO module; ZENON Environmental Inc; pp. 1–3, drawings not published but relate to a module used or sold in the U.S.A. prior to May 17, 2001.
Suda, K. et al. "Development of a tank–submerged bype membrane filtration system", Jun. 1998, pp. 151–158.

Primary Examiner—Ana Fortuna
(74) Attorney, Agent, or Firm—Bereskin & Parr

(57) ABSTRACT

An apparatus for filtering a liquid in a tank has a plurality of elements and a frame for holding the elements while they are immersed in the liquid. The elements have a plurality of hollow fibre membranes attached to and suspended between an upper header and a lower header. The membranes are in fluid communication with one or more permeate channels in one or more of the headers. Releasable attachments between the headers and the frame allow the frame to releasably hold the elements by their headers. The size and configuration of the frame determines the positions of the upper and lower headers of each element relative to each other. Connections between the permeate channels and one or more permeate collection tubes attached to the frame are releasable and resealable connections which are made or broken automatically by the movements involved in inserting or removing an element into or out of the frame.

19 Claims, 20 Drawing Sheets

U.S. PATENT DOCUMENTS

| | | | |
|---|---|---|---|
| 5,480,553 A | 1/1996 | Yamamori et al. | |
| 5,484,528 A | 1/1996 | Yagi et al. | |
| 5,639,373 A | 6/1997 | Mahendran | |
| 5,783,083 A * | 7/1998 | Henshaw et al. | 210/636 |
| 5,922,201 A | 7/1999 | Yamamori et al. | |
| 5,944,977 A | 8/1999 | Pedersen et al. | |
| 6,156,200 A * | 12/2000 | Zha et al. | 210/321.89 |
| 6,214,231 B1 * | 4/2001 | Cote et al. | 210/636 |
| 6,277,209 B1 | 8/2001 | Yamada et al. | |
| 6,324,898 B1 * | 12/2001 | Cote et al. | 73/38 |
| 6,325,928 B1 * | 12/2001 | Pedersen et al. | 210/232 |
| 6,632,358 B1 | 10/2003 | Suga et al. | |
| 6,656,356 B1 | 12/2003 | Gungerich et al. | |
| 6,790,360 B1 * | 9/2004 | Pedersen et al. | 210/636 |

FOREIGN PATENT DOCUMENTS

| | | |
|---|---|---|
| JP | 60261509 | 12/1985 |
| JP | 62-144712 | 6/1987 |
| JP | 7024264 | 1/1995 |
| JP | 07024272 | 1/1995 |
| JP | 7155564 | 6/1995 |
| JP | 7178321 | 7/1995 |
| JP | 07-185271 | 7/1995 |
| JP | 7275665 | 10/1995 |
| JP | 7289859 | 11/1995 |
| JP | 8019730 | 1/1996 |
| JP | 8257372 | 10/1996 |
| JP | 08-323181 | 12/1996 |
| JP | 8332483 | 12/1996 |
| JP | 9099222 | 4/1997 |
| JP | 09-099222 | 4/1997 |
| JP | 9215980 | 8/1997 |
| JP | 08024591 | 1/1998 |
| JP | 10118470 | 5/1998 |
| JP | 10244262 | 9/1998 |
| JP | 11076764 | 3/1999 |
| JP | 11104466 | 4/1999 |
| JP | 11165200 | 6/1999 |
| JP | 2000-288359 | 10/2000 |
| WO | WO 98/28066 | 7/1998 |
| WO | WO 99/29630 | 6/1999 |
| WO | WO 00/09245 A2 | 2/2000 |
| WO | WO 00/21890 * | 4/2000 |

* cited by examiner

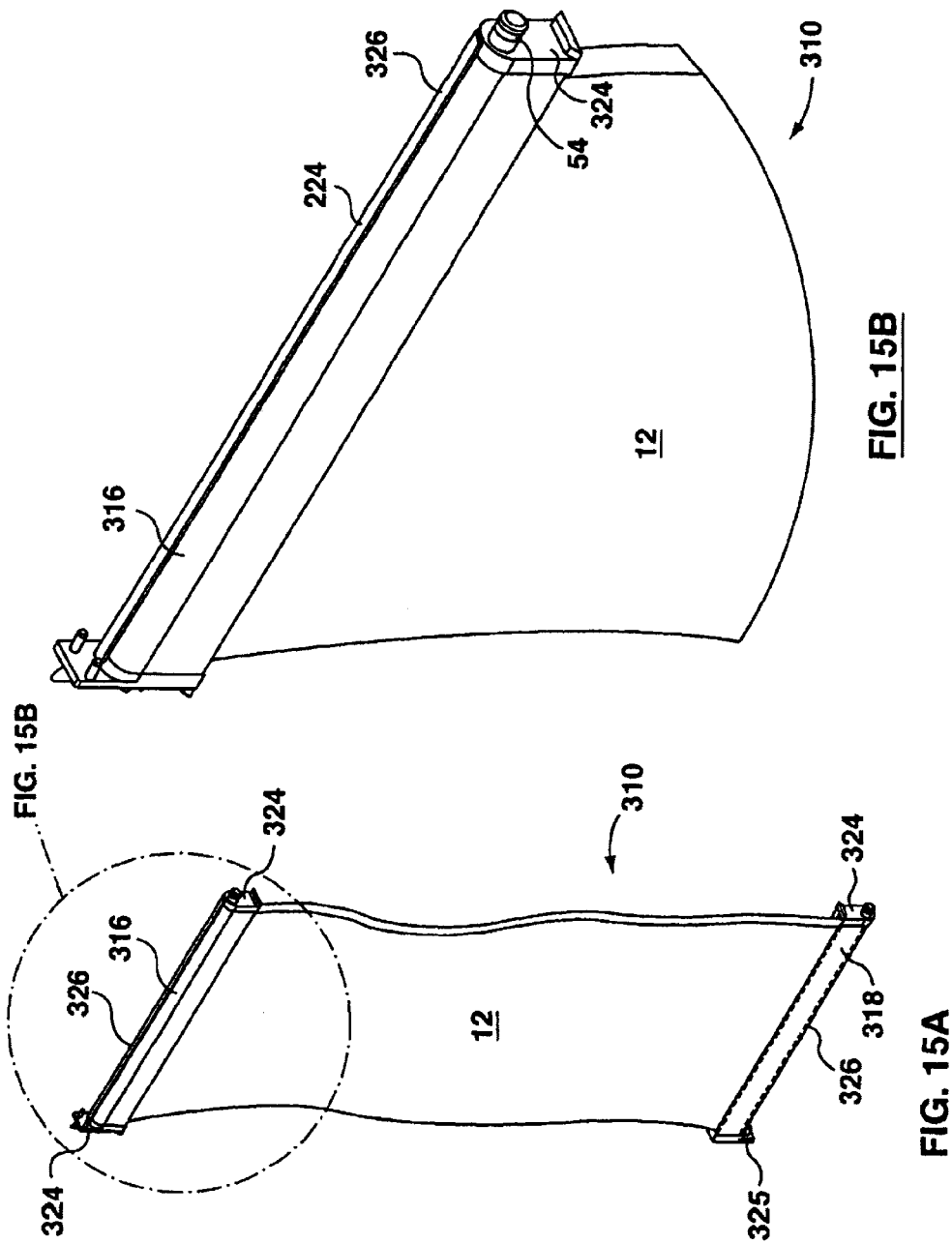

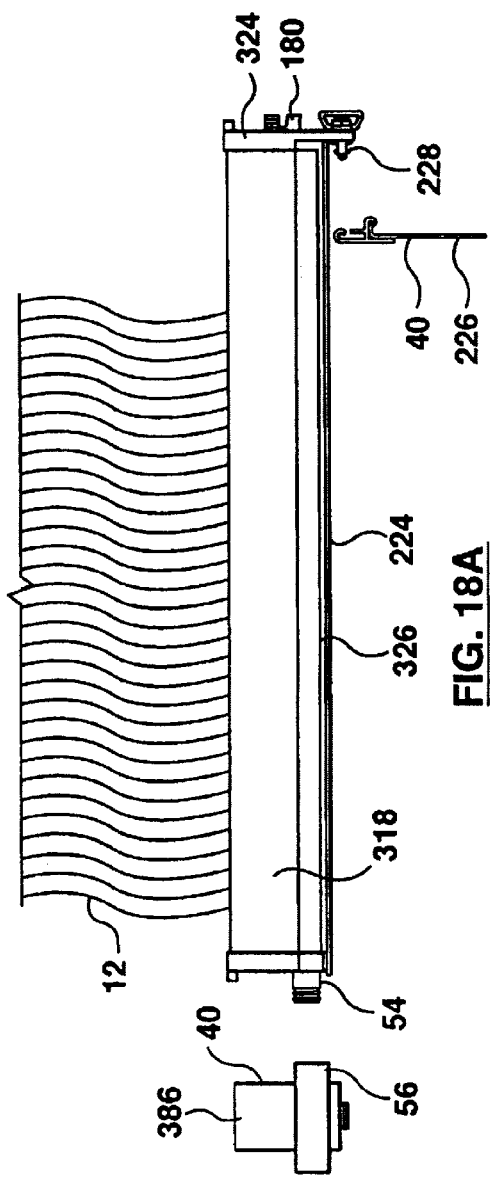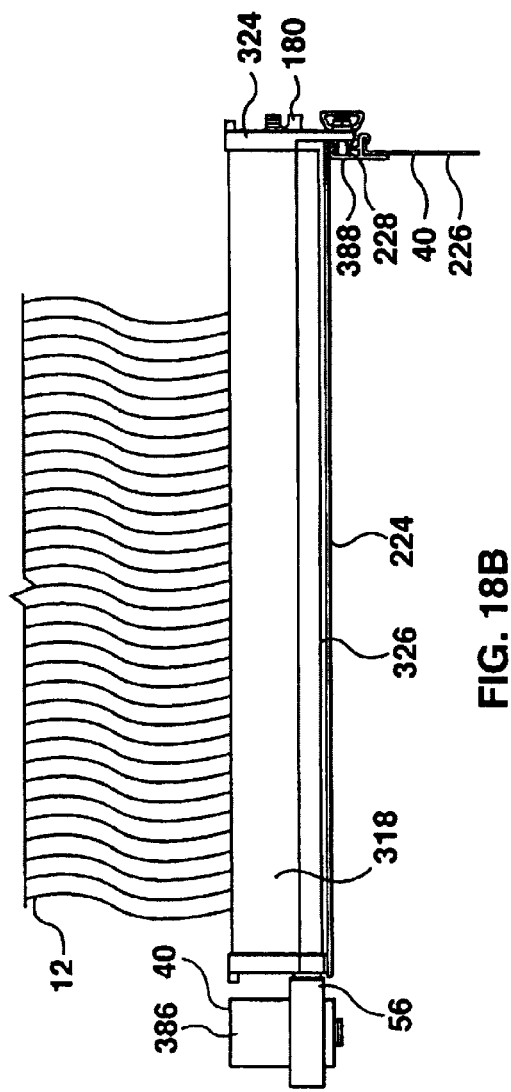

IMMERSED MEMBRANE APPARATUS

This (a) is a continuation in part of U.S. Ser. No. 09/889,352 filed Jul. 17, 2001, which is a National Stage entry of PCT/CA00/01359 filed Nov. 15, 2000 and (b) claims priority from Canadian application number CA 2,348,186, filed May 18, 2001. All of the patents and applications listed above are incorporated herein by this reference to them.

FIELD OF THE INVENTION

This invention relates to filtering membranes and particularly to modules of immersed, suction driven, ultrafiltration or microfiltration membranes used to filter water or wastewater.

BACKGROUND OF THE INVENTION

Submerged membranes are used to treat liquids containing solids to produce a filtered liquid lean in solids and an unfiltered retentate rich in solids. For example, submerged membranes are used to withdraw substantially clean water from wastewater and to withdraw potable water from well water or surface water.

Immersed membranes are generally arranged in modules which comprise the membranes and headers attached to the membranes. The modules are immersed in a tank of water containing solids. A transmembrane pressure ("TMP") is applied across the membrane walls which causes filtered water to permeate through the membrane walls. Solids are rejected by the membranes and remain in the tank water to be biologically or chemically treated or drained from the tank.

U.S. Pat. No. 5,639,373, issued to Zenon Environmental Inc. on Jun. 17, 1997, describes one such module using hollow fibre membranes. In this module, hollow fibre membranes are held in fluid communication with a pair of vertically spaced headers. TMP is provided by suction on the lumens of the fibres through the headers. Other modules are shown in U.S. Pat. No. 5,783,083 issued to Zenon Environmental Inc. on Jul. 21, 1998, PCT Publication No. WO 98/28066 filed on Dec. 18, 1997 by Memtec America Corporation and European Patent Application No. EP 0 931 582 filed Aug. 22, 1997 by Mitsubishi Rayon Co., Ltd. As discussed in these documents, various means are provided for fixing modules together generally permanently into larger units.

SUMMARY OF THE INVENTION

It is an object of the present invention to improve on the prior art. It is another object of the present invention to provide a filtration apparatus comprising a plurality of elements, for example, elements of immersed, suction driven, hollow fibre membranes, mounted to a frame. Embodiments of the invention provide few components to interfere with the flow of tank water through the apparatus, efficient permeate pipe connections, elements that may be removed easily and without interfering with adjacent elements, elements that may be economically manufactured to a wide range of sizes, an apparatus that may be assembled with variable spacing between elements, and a distance between headers of the elements that can be altered to account for membrane shrinkage in use. The objects of the invention are met by the combinations of features, steps or both described in the claims. The following summary may not describe all necessary features of the invention which may reside in a sub-combination of the following features or in a combination of some or all of the following features and features described in other parts of this document.

In various aspects of the invention, the invention is directed at an apparatus for filtering a liquid in a tank having a plurality of elements, and a frame for holding the elements while they are immersed in the liquid. The elements have a plurality of hollow fibre membranes attached to and suspended between an upper header and a lower header. The membranes are in fluid communication with one or more permeate channels in one or more of the headers. Releasable attachments between the headers and the frame allow the frame to releasably hold the elements by their headers. While the frame is holding the elements, the elements themselves do not have any means for holding the headers in position relative to each other. For example, if the frame were removed, the headers would be free to move out of position relative to each other. As a result, the size and configuration of the frame determines the positions of the upper and lower headers of each element relative to each other. When out of the frame, the elements may be inserted into a separate carrying frame, if desired, for transport or handling.

An assembled filtration apparatus, which may be called a cassette, has a plurality of elements held such that the membranes are generally vertical when immersed in the liquid in the tank. The headers may be elongated in shape and held in a generally horizontal orientation when the membranes are immersed in the tank. The frame holds the elements so as to provide a spacing between adjacent elements and allows tank water to rise vertically through the frame and past the elements.

To assemble a filtration apparatus, the upper headers are slid into the frame, for example, through track and slider mechanism that may support the element whenever about one quarter of the length of the upper header is inserted into the frame. The lower header may similarly slide into the frame, for example through another track and slider mechanism. Or, while the element is supported by the upper header, the lower header may be swung into position to attach to releasable supports which engage with the ends of the lower header.

The frame holds or restrains the elements in place, but the restraint provided by the frame may be released for a selected element individually. The selected element may be removed by reversing the steps for assembly without disassembling the remainder of the module. Connections between the permeate channels and one or more permeate collection tubes attached to the frame are releasable and resealable connections which are made or broken automatically by the movements involved in inserting or removing an element into or out of the frame.

The frame may have cross bars located on uprights, the cross bars holding the elements. The vertical location of the cross bars may be changed from time to time to maintain the membranes in a slightly slackened condition although their length may decrease in use.

Aerators are mounted generally below the elements and supply scouring bubbles to the cassette and circulate tank water. The elements may be narrow, each element being a rectangular skein of hollow fibres having an effective thickness of between 4 and 8 rows of hollow fibres. The headers, which may be extruded, may be thin to not greatly increase the width of the element. The attachments between the frame and the elements are positioned to provide horizontal spaces between adjacent elements, preferably at least one third of the width of the headers measured in the direction of the horizontal spacing, to promote penetration of the bubbles and tank water into the elements.

Elements may be placed back to back in pairs separated by permeate pipes. The connections between the permeate pipes and the elements release when an element is pulled out of the cassette and reseal when the element is replaced in the cassette. Thus a single element can be removed for maintenance without disconnecting other parts of the permeate pipe network. A large permeate collector may be connected to a small group of elements by a short local permeate pipe with a valve that permits the small group of elements to be isolated. Thus, while waiting for repair, permeation can continue with the remaining elements. The large permeate collector may be located above the water surface and connect to an even larger collector which may be located on the edges of a tank.

The headers may be made of an extrusion which may be cut to any desired length and capped with caps. The horizontal distance between the cross bars of the frame can be altered by changing the dimensions of the frame or the location of the cross bars relative to the frame. Longer or shorter cross bars can be used which hold fewer or more elements. The vertical distance between cross bars can be altered by changing the dimensions of the frame or the location of the cross bars relative to the frame. Accordingly, a cassette may be produced in a variety of sizes by altering the length of cut of one or more of the header extrusion, the cross bars or the frame members.

BRIEF DESCRIPTION OF THE DRAWINGS

Preferred embodiments of the present invention will now be described with reference to the following figures.

FIG. 15A is a perspective view of an element of a third embodiment.

FIG. 15B is a close up view of part of FIG. 15A.

FIGS. 18A and 18B are side views of the releasable attachment between a lower header and frame of the third embodiment.

DETAILED DESCRIPTION OF THE INVENTION

A First Embodiment

The following paragraphs describe a first embodiment that is shown in FIGS. 1 to 7. Although the description below may at times refer to specific figures, some components discussed may be shown only in others of FIGS. 1 to 7.

Figure 1:
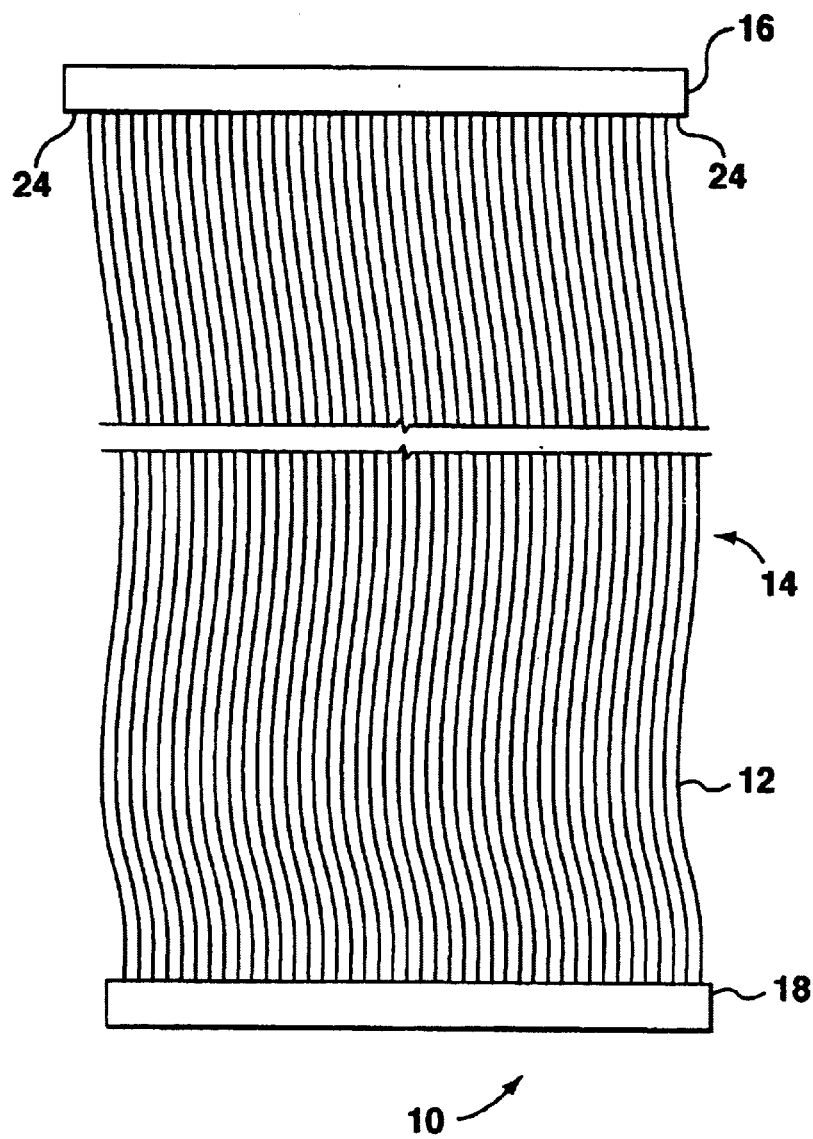
FIG. 1 is a somewhat schematic front elevation of a filtering element.
Figure 2:
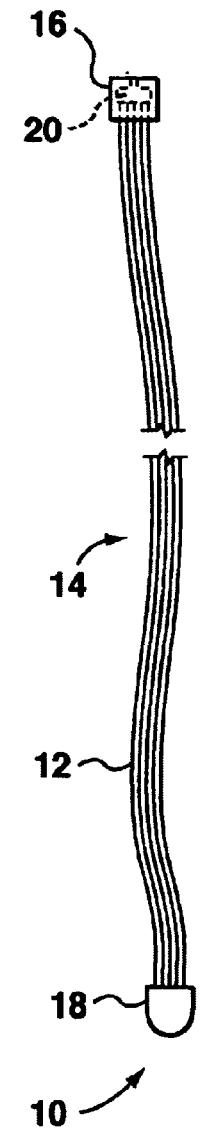
FIG. 2 is a somewhat schematic side elevation of the filtering element of FIG. 1.

FIGS. 1 and 2 show simplified front and side elevations respectively of a filtering element 10. The element 10 has a plurality of hollow fibre membranes 12 in the form of a rectangular skein 14 suspended between an upper header 16 and a lower header 18. The rectangular skeins 14 may be between four and eight layers of membranes 12 deep (five layers being shown in FIG. 2), optionally up to 12 layers deep, and are in the range of several tens of membranes 12 wide. The element 10 itself does not include any permanently attached means for holding the headers 16, 18 in position relative to each other but the element 10 may be connected to a carrying frame if required for transport or handling. The lack of means for holding the headers 16, 18 in position relative to each other improves the flow of tank water about the element 10 and avoids a possible source of damage to the membranes 12.

The membranes 12 typically have an outside diameter between 0.4 mm and 4.0 mm. The length of the membranes 12 is chosen to maximize flux for a given cost according to relationships known in the art and is typically between 400 mm and 1,800 mm. The membranes 12 have an average pore size in the microfiltration or ultrafiltration range, preferably between 0.003 microns and 10 microns and more preferably between 0.02 microns and 1 micron.

The upper header 16 has a permeate channel 20 in fluid communication with the lumens of the membranes 12. The membranes 12 in FIGS. 1 and 2 are sealed in the lower header 18, but the lower header 18 may also have a permeate channel in fluid communication with the lumens of the membranes 12 to permit permeation from both ends of the membranes 12. The membranes 12 are potted into the upper header 16 (and any other permeating header) such that the membranes 12 are all closely spaced apart from each other. Potting resin completely surrounds the outsides of the end of each membrane 12 to provide a watertight seal so that water can only enter the permeate channel after first flowing though the membranes 12. Suitable potting resins include polyurethane, epoxy, rubberized epoxy and silicone resin. One or more resins may also be used in combination to meet objectives of strength and providing a soft interface with the membranes 12 and avoiding cutting edges.

A potting method like that described in U.S. Pat. No. 5,639,373, which is incorporated herein by this reference, may be used to pot layers of membranes 12. Other potting methods known in the art, include methods that produce non-layered or random arrangements of the membranes, may also be used. In particular, the methods described in Canadian Patent Application No. 2,308,234, filed May 5, 2000 by Zenon Environmental Inc., and in U.S. application Ser. No. 09/847,338, filed on May 3, 2001 by Rabie et al., both of which are incorporated herein by this reference, may be used. The thickness of the assembled mass of membranes 12 may be between 18 and 40 mm. Headers 16, 18 to accommodate such masses of membranes may be 40 to 50 mm wide, typically 40 mm. The potting densities may be between 10% and 40%. For example, an element 10 may use membranes 12 as used in commercially available ZW 500 (TM) modules made by Zenon Environmental Inc. which have an outside diameter of about 2 mm, an un-potted length (meaning the unsupported length of membrane 12 between the upper header 16 and lower header 18) of 1,600 to 1,900 mm, and a pore size of approximately 0.1 microns.

Figure 3:
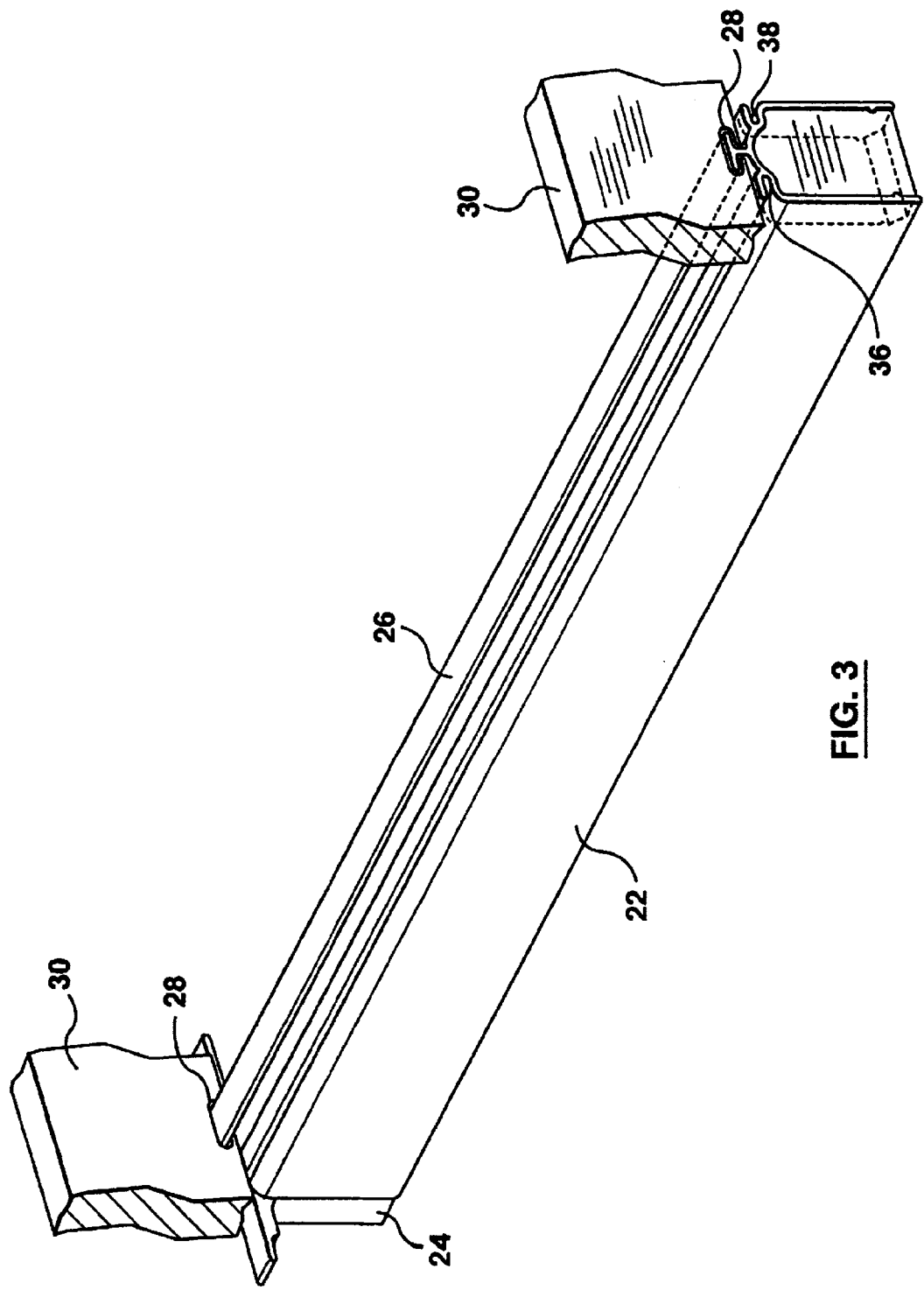
FIG. 3 is an isometric view of a header of an element of a first embodiment.
Figure 4:
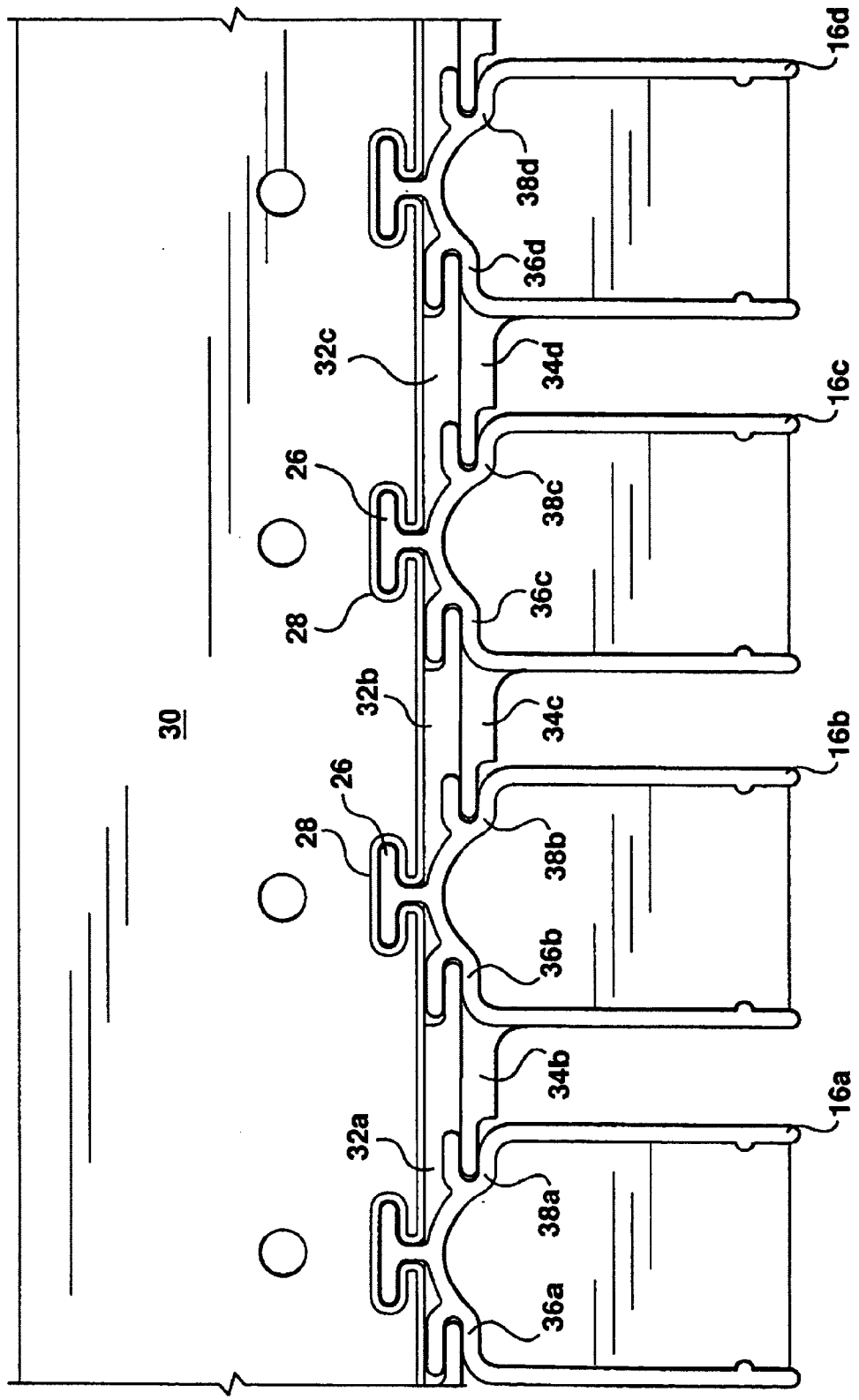
FIG. 4 is an elevation of the end of 4 adjacent headers of FIG. 3.

Referring to FIG. 3, the upper header 16 is shown. The lower header 18 is the same would be mounted in an inverted position. The upper header 16 includes a body 22 preferably extruded from a suitable plastic such as PVC or ABS. The extrusion can be cut to a wide range of sizes as desired. A back cap 24 is attached to the body 22 by gluing or welding. The body 22 includes a key 26 running the length of the top of the upper header 16. The back cap 24 is shaped to extend the key 26. The key 26 fits into slots in cross bars 30 of which only short sections are shown. The back cap 24 has an upper wing 32 and a lower wing 34. The back cap 24 and the body 22 each have an upper channel 36 and a lower channel 38. A front cap is attached to the front of the body 22 but has been omitted from FIG. 3 to show the cross-section of the body 22. The front cap need not have any wings 32, 34 but it does have channels 36, 38, Referring to FIG. 4, four upper headers 16 are attached to a section of cross bar 30 spaced to leave about 20 to 25 mm between adjacent upper header 16. The lower headers 18 are similarly attached to another cross bar 30 but in an inverted position. The cross bar 30 can be cut to any desired length. To avoid the need to cut slots 28 into a long cross bar, the one piece cross bar 30 shown can be replaced with a standard extruded section, such as an inverted "C" channel, which supports any suitable hanger containing a slot 28. In that case, the standard extrusion is cut to a desired length and an appropriate number of hangers are attached or slid into it which allows the number of elements 10 to be easily varied.

The upper headers 16 and their associated upper wings 32, lower wings 34, upper channels 36 and lower channels 38 are all designated a, b, c, d to indicate which of those parts is associated with which upper header 16. As shown, the upper wing 32 of a first upper header 16 engages the upper channel 36 of an adjacent upper header 16 and the lower wing 34 of the first upper header 16 engages the lower channel 38 of an adjacent upper header 16 on the other side. But, the upper wings 32 and lower wings 34 do not interfere with each other in the direction of the length of the upper headers 16. Accordingly, each upper header 16 can be moved into or out of its position in a direction parallel to the upper header 16. Further, although the cross bar 30 provides support at only one point, a moving upper header 16 is supported and vertically positioned by its adjacent upper headers 16 aong its travel. This makes it much easier to insert or withdraw an element 10 despite the lack of (a) means within the element 10 itself for maintaining separation between the headers 16, 18 or (b) continuous frame channels paralleling the length of each header 16, 18 which would add many parts, add to the overall cost and manufacturing time, as well as interfere with bubbles and tank water moving past the headers 16, 18. A releasable catch can be incorporated into the slot 28 and key 26 structure, typically at the front only, to provide a releasable restraint in the direction of the headers 16, 18.

Figure 5:
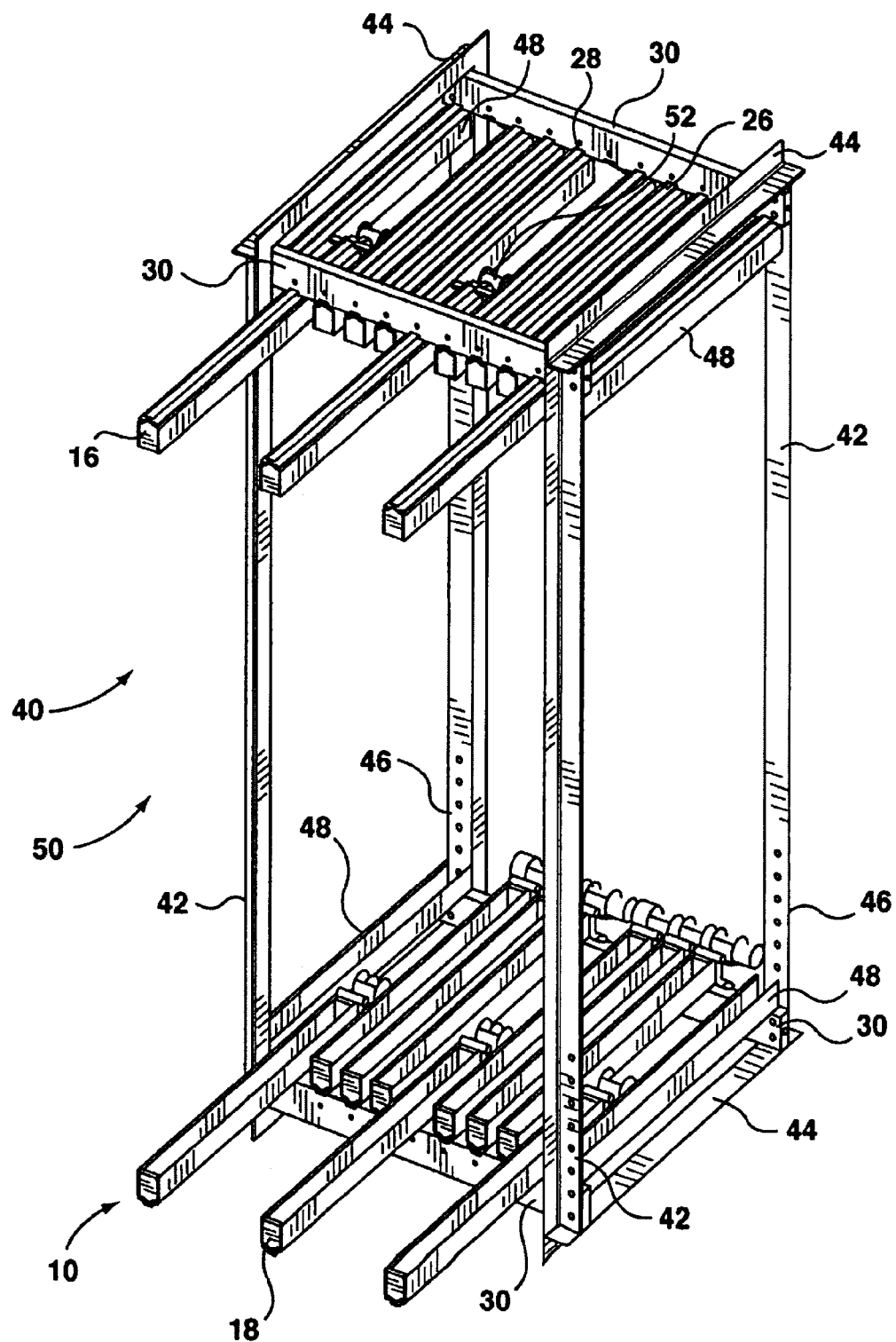
FIG. 5 is an isometric view of a frame for a cassette with headers attached.
Figure 6:
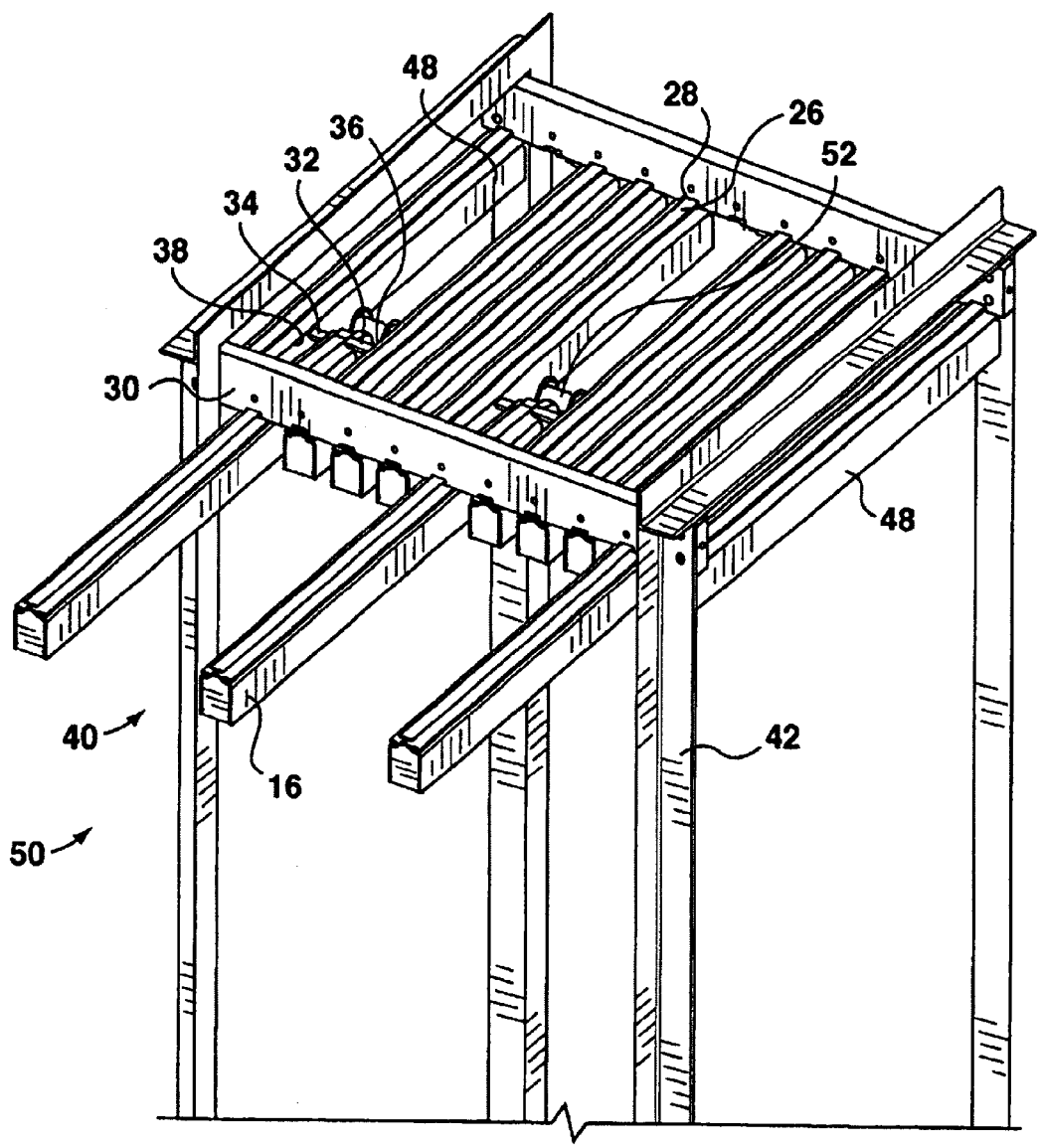
FIG. 6 is a close up of the top of FIG. 5.

Referring to FIGS. 5 and 6, a cassette 50 includes a frame 40 for holding several elements 10. The frame 40 includes top and bottom, front and back cross bars 30, uprights 42 and struts 44 as shown. Three elements 10 (with membranes 12 removed for clarity) are shown being withdrawn from the frame 40. Extra blank (ie. unpotted) headers 48 are optionally included between the uprights 42 to provide support for the wings 32, 34 of the first element 10 on each side. An element 10 may be completely withdrawn and then supported by hand or a single element carrying frame (not shown) may be placed against the frame 40. The element 10 is then slid into the carrying frame which may allow the element 10 to be more easily worked with.

The length of the uprights 42 is chosen as appropriate for any desired length of membranes 12. The vertical distance between cross bars 30 is chosen so that the membranes 12 will be slightly slacked, their free length being, for example, 0.1% to 2% more than the distance between proximal faces of the headers 16, 18. Particularly in wastewater applications where the tank water will be warm, ie. 30–50 C., the membranes 12 may shrink within the first few weeks or months of operation. To account for this shrinkage, the uprights 42 may be provided with a series of mounting holes 46 which allow at least one set of the upper or lower cross bars 30 to be moved to maintain the membranes 12 in a slightly slackened position. Although not shown, a suitable aerator (designs are known in the art) may be mounted to the frame 40 or placed on a tank floor below the frame 40 to provide bubbles from below the cassette 50. The aerator is designed and positioned to encourage bubbles and tank water to flow upwards through the frame 40 and past the elements 10, through the spaces between adjacent elements 10 and between the membranes 12 within the elements 10.

To connect the headers 16, 18 to permeate pipes, the back of any permeating headers 16, 18 are fitted with header permeate connections 52 that can be released and resealed to a permeate pipe located behind the headers 16, 18 and permit movement of the element 10 parallel to the headers 16, 18. For example, FIGS. 5 and 6 show commercially available clip on adapters sold under the trade mark UNI-SPRAY. These connectors 52, however, require a clip to be released at the back of the element 10 which is difficult to do if the elements 10 are placed back to back to share common permeate pipes.

Figure 7:
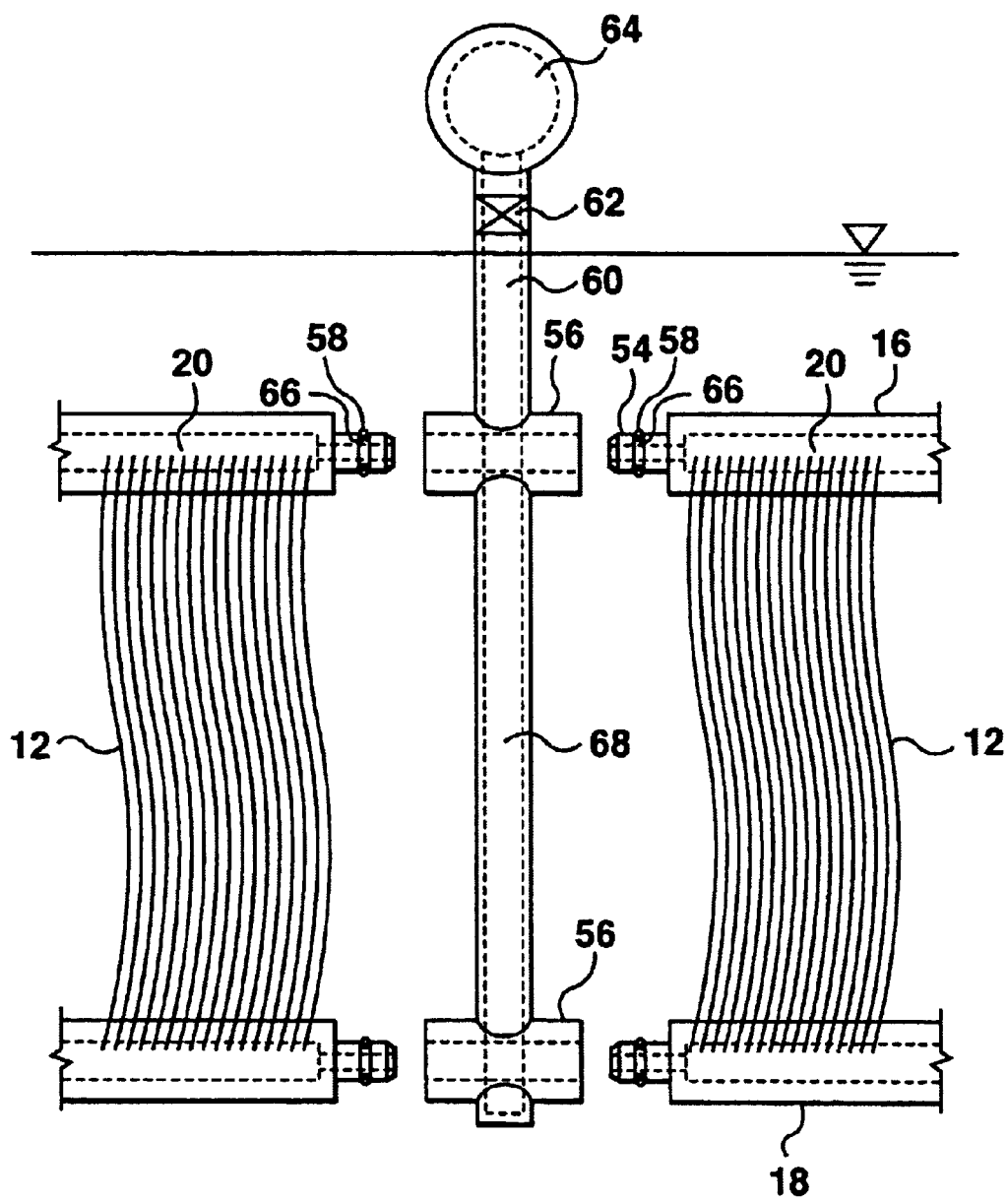
FIG. 7 is a diagrammatic drawing of part of two elements placed back to back and connected to a permeate pipe.

Referring to FIG. 7, pairs of cassettes 50 (partially shown, frames 40 omitted, for example) are placed back to back with a local permeate pipe 60 in between them. The frames 40 (not shown) of the two cassettes 50 are tied together to maintain a fixed distance between them. The upper headers 16 (and lower headers 18 if they are permeating) include male fittings 54 which releasably form a seal with a female fitting 56 attached to the local permeate pipe 60. The seal is made by means of O-rings 58 fitted into O-ring grooves 66 in the male fittings 54. The male fittings 54 are thus connected to a local permeate pipe 60 which may service a small number of elements 10, ie. 2–6 elements 10. The local permeate pipe 60 has an isolation valve 62, for example a ball valve located above the water line, which permits the small group of elements 10 to be isolated from the rest of the cassette 50. The local permeate pipes 60 connect into a larger permeate collector 64 which may be located at the level of even larger collector which may be located at the edge of a tank. Thus, the necessary connections may be made simply and without expensive flexible pipes. If the bottom headers 18 are also permeating, appropriate male fittings 54 are attached to the bottom headers 18 at the level of female fittings 56 on or in communication with a local permeate pipe extension 68 which may be an extension of the local permeate pipe 60. If the bottom headers 18 are permeating headers, then the top headers may not be.

A Second Embodiment

The following paragraphs describe a second embodiment, parts of which are shown in FIGS. 8 to 14. Although the description below may at times refer to specific figures, some components discussed may be shown only in others of FIGS. 8 to 14 or in figures discussed with other embodiments. The second embodiment is similar to the first embodiment in many respects. Aspects of the second embodiment that do not differ substantially from the first embodiment may not be described in the following paragraphs which will concentrate on the features of the second embodiment which differ from the first.

Figure 8A:
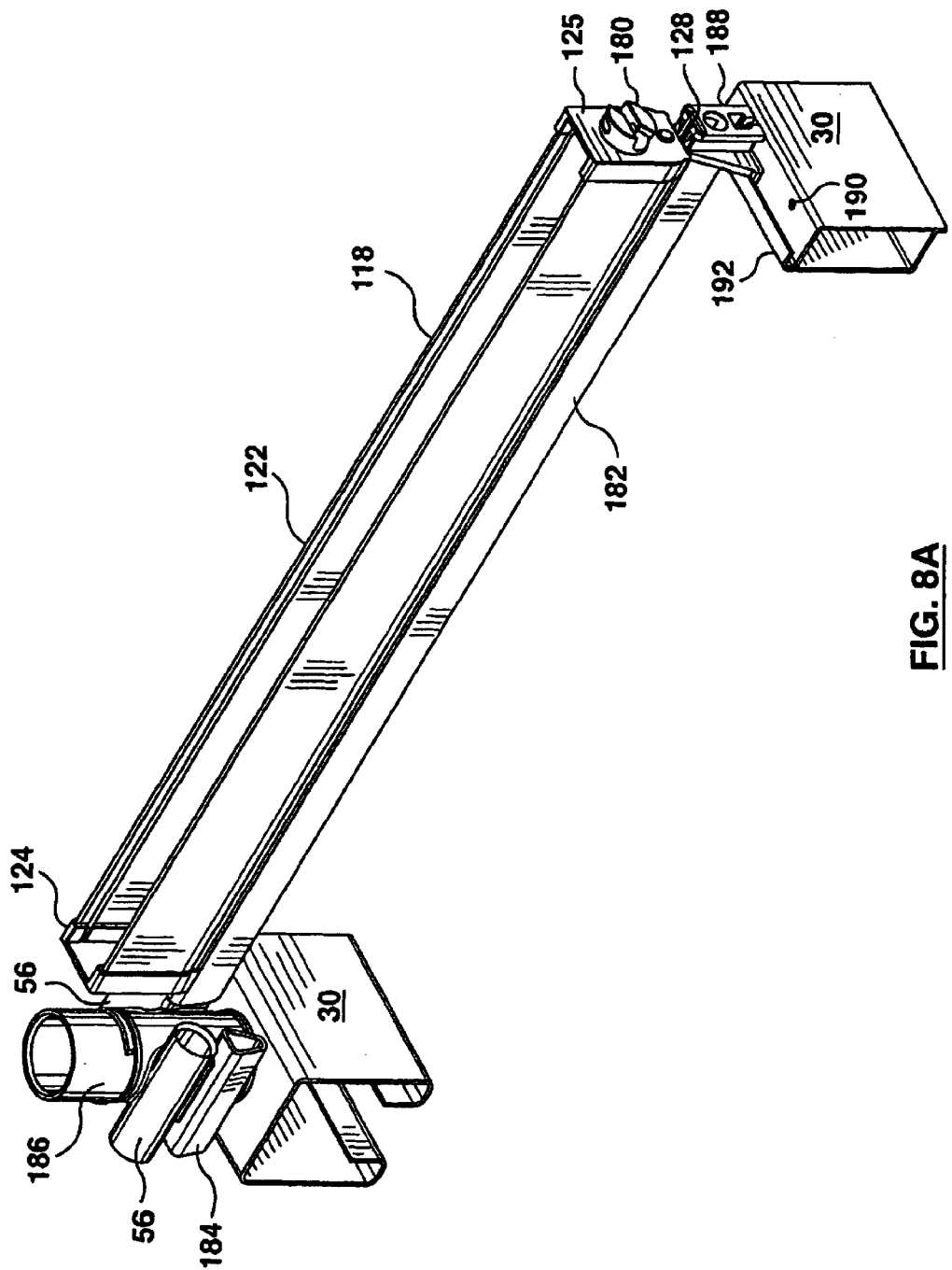
FIG. 8A is a perspective view of a header and releasable attachment of a second embodiment.
Figure 8B:
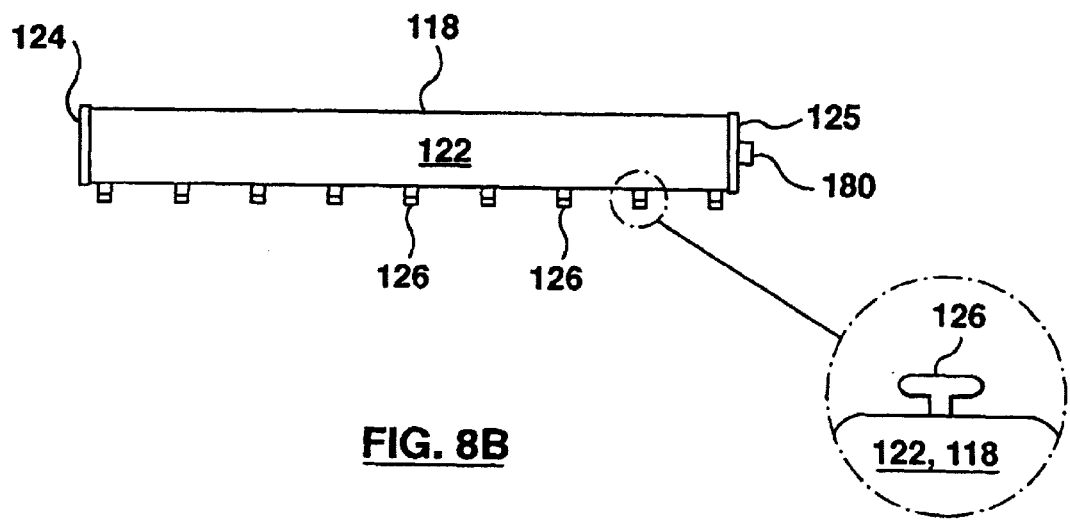
FIG. 8B is a side view of the header of FIG. 8A.

A second lower header 118 is shown in FIGS. 8A and 8B. A second upper header 116 (not shown in this figure) is similar, but mounted in an inverted position. The second lower header 118 has a second key 126 on its lower surface that may be continuous like that of the second header 18. Optionally, the second key 126 may be segmented, for example as shown in FIG. 8B, which helps prevent the second key 126 from sticking in the second slot 128, which will be described below.

The second lower header 118 does not have an upper channel 36 or a lower channel 38. A second back cap 124 of the second lower header 188 also does not have an upper wing 32 or a lower wing 34, but rather is of a similar section as the second body 122 of the second lower header. A second front cap 125 is fitted to the front of the second body and has a pull tool fitting 180 adapted to allow a tool to pull on the second lower header 118 for removal.

FIG. 8A also shows a track piece 182 located below the second lower header 118. A similar track piece 182 would be located above the second upper header 116. The track piece 182 provides part of a continuous second slot 128 that the second keys 126 may slide into and be supported by. The track piece 182 is supported at both ends by the cross bars 30. For example, in the embodiment shown, one end of the track piece 182 fits over and is supported by an abutment 184 attached to the side of a permeate pipe stub 186 resting on a cross bar 30. The permeate pipe stub 186 is sealed at its lower end and ready to be connected to a local permeate pipe extension 68 (not shown in FIG. 8A, refer to FIG. 7) at its upper end. The permeate pipe stub 186 also has female fittings 56 in fluid communication with the inside of the permeate pipe stub 186. The female fittings 56 are located and oriented so that when the second lower header 118 is fully inserted in the second slot 128, a male fitting 54 (not visible) is sealingly connected to the female fitting 56. The other end of the track piece 182 in the embodiment shown is supported by a locking clip 188 which both supports the track piece 182 relative to the cross bar 30, but also completes the second slot 128 and releasably locks the second lower header 118 in position when the second lower header 118 is fully inserted in the second slot 128. The locking clip 188 is held in place by fitting into a cross bar channel 192 and is located along the length of the cross bar 30 by interaction with a positioning hole 190. The description above also applies, but with inverted orientation, for the second upper headers 116.

Figure 9:
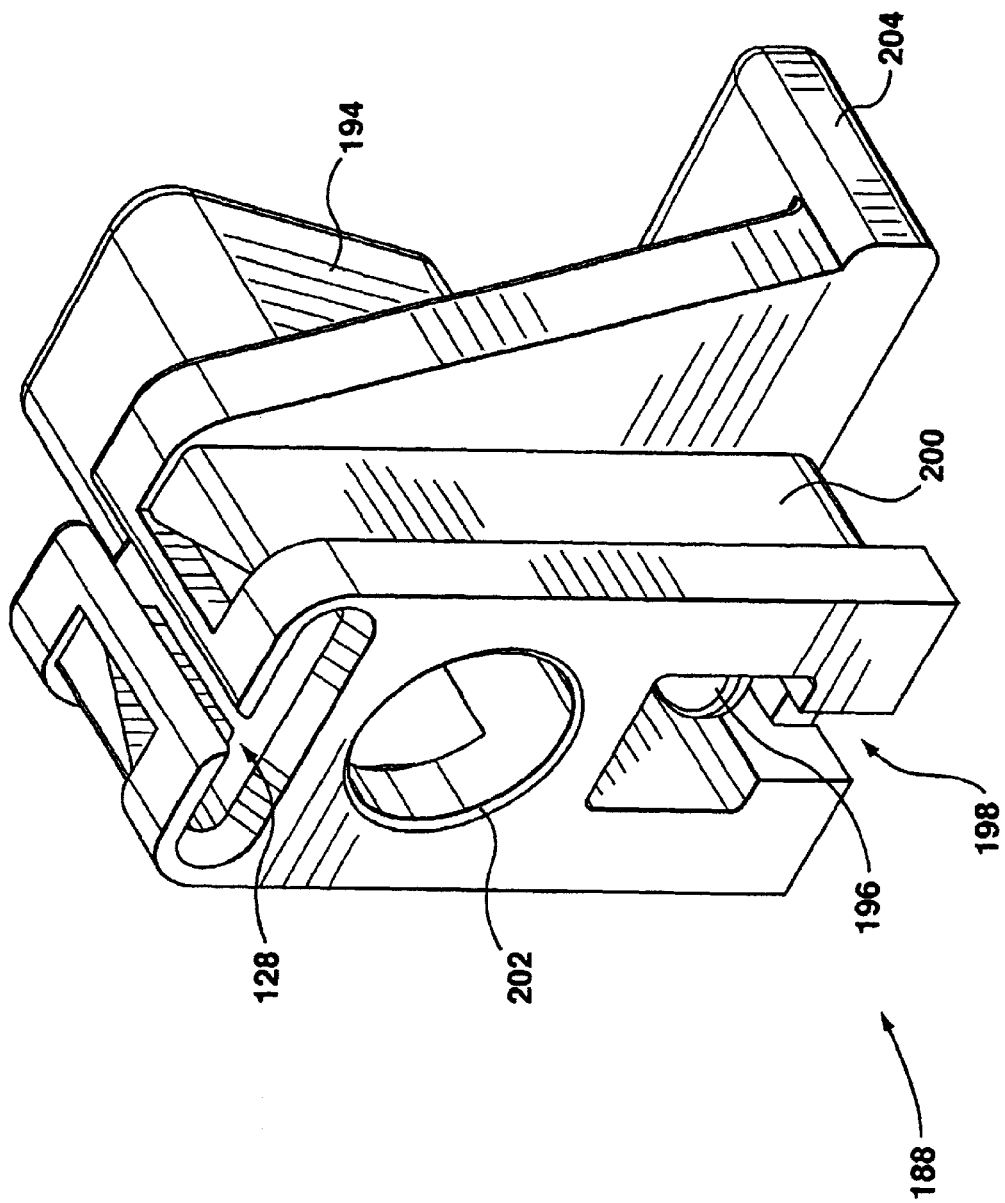
FIGS. 9 and 10 are assembled and exploded views of a component of the releasable attachment of FIG. 8.
Figure 10:
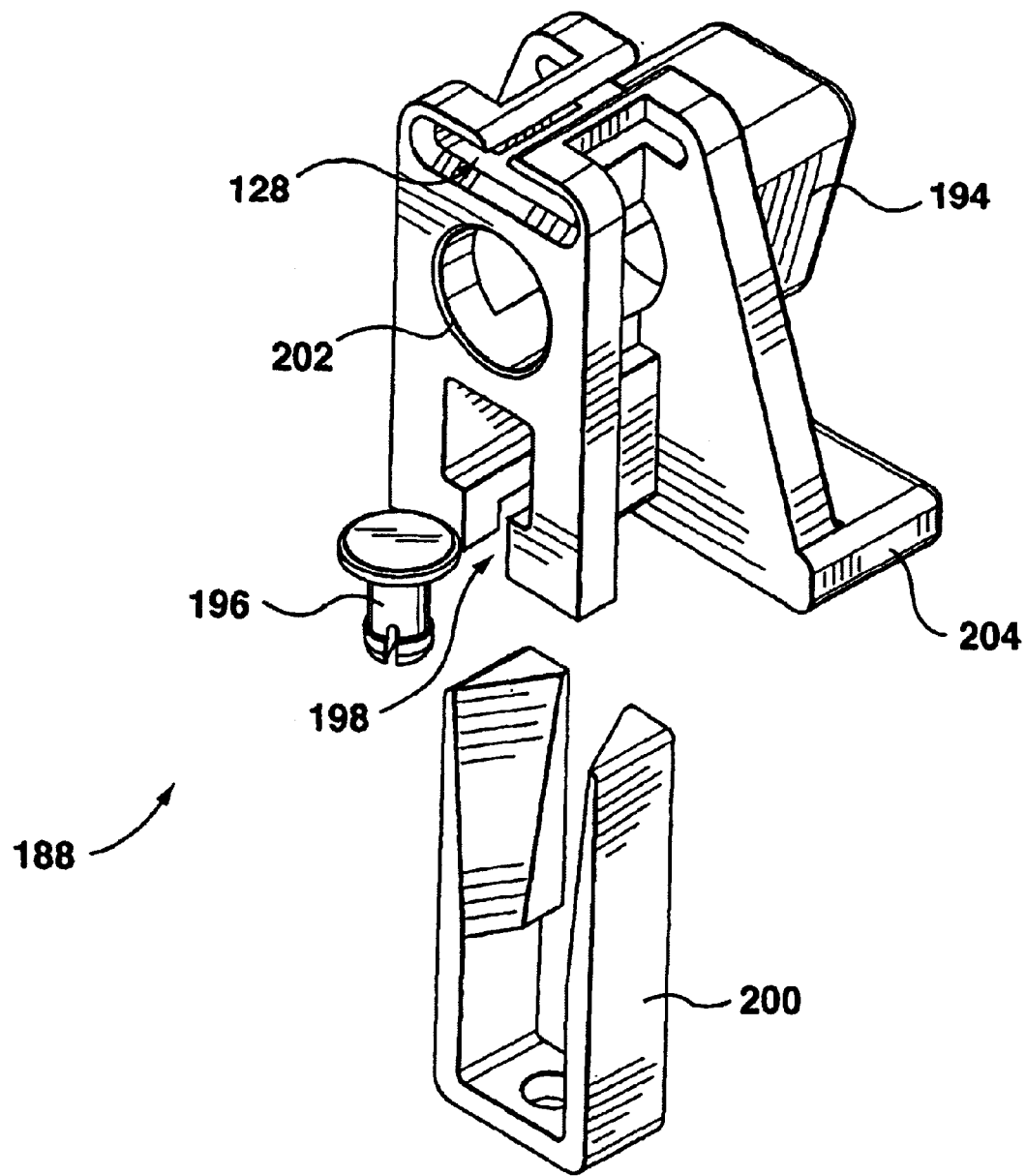

FIGS. 9 and 10 show the locking clip 188 in greater detail. A locking clip abutment 194 is sized and shaped to fit into and support the track piece 182. A peg 196 fits into a peg slot 198 to provide a means for locating the locking clip 188 over a positioning hole 190. A catch 200 fits over the body of the locking clip 188 and, in an unbent position, fills a part of the second slot 128. However, the catch 200 has tapered faces so that the catch 200 can move out of the second slot when a second key 126 is slid into the second slot 128. After the end of a second key 126, or series of discontinuous second keys 126 passes the catch 200, they are prevented from moving back out of the second slot 126. However, a release hole 202 also provides access to the tapered faces of the catch 200. By inserting a rod into the release hole 202, the catch 200 can be held open to allow a second key 126 to be pulled back out of the second slot 128. The locking clip 188 also has a foot 204 sized to engage with the cross bar channel 192.

Figure 11:
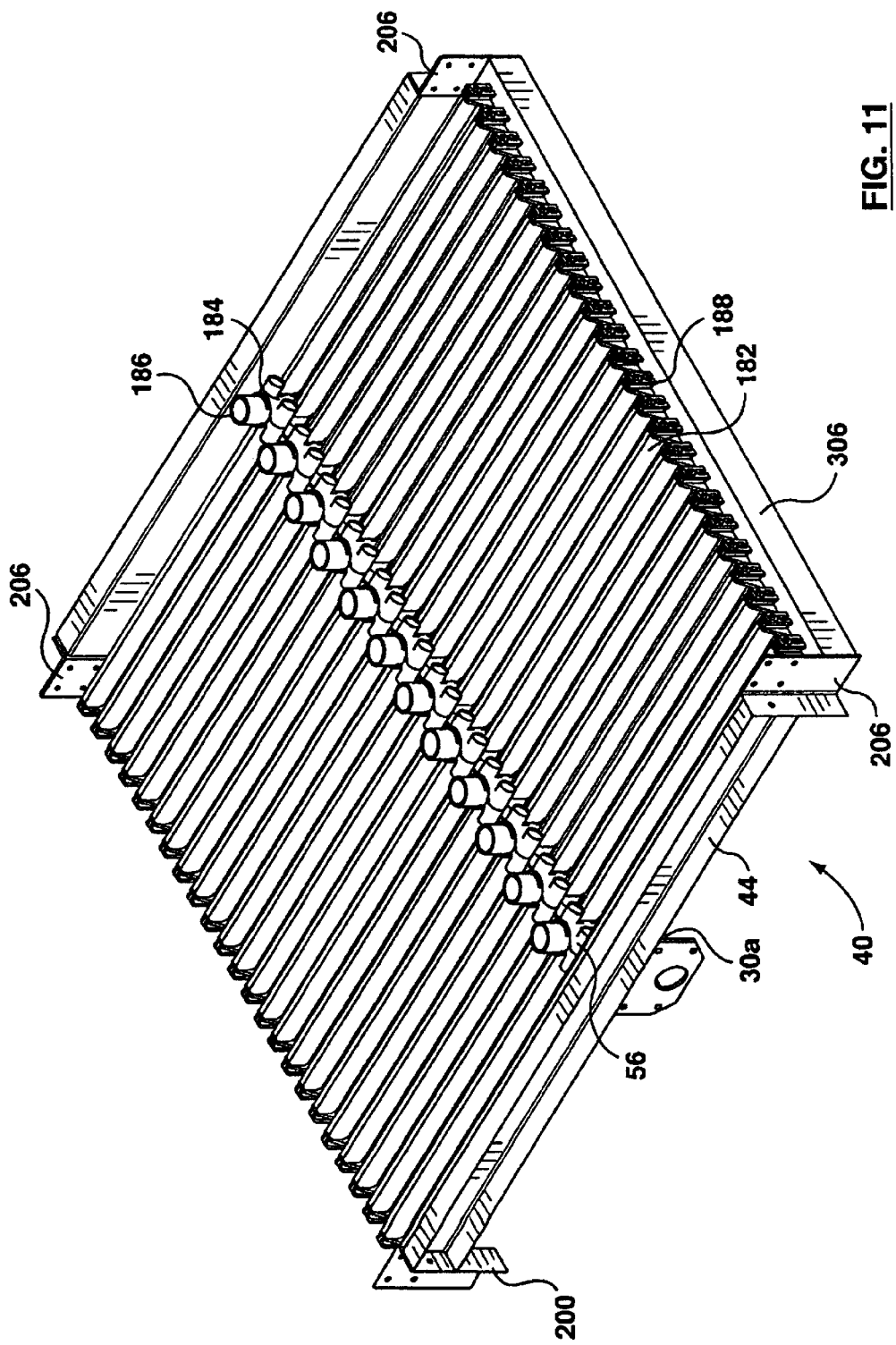
FIG. 11 is a perspective view of parts of a frame and releasable attachments of the second embodiment.

FIG. 11 shows how the bottom part of a frame 40 ready to receive second elements 110. As shown, a pair of struts 44 are attached to a central cross bar 30a and two end cross bars 30b, only one visible. Four brackets 206 are provided to attach to uprights 42. The central cross bar 30a supports a number of permeate pipe stubs 186 which in turn have abutments 184 holding track pieces 182. The end cross bars 30b support locking clips 188 which support the other ends of the track pieces 182. If the second lower headers 118 were not permeating headers, then the central cross bar 30a would also be used to support locking clips 188.

Figure 12:
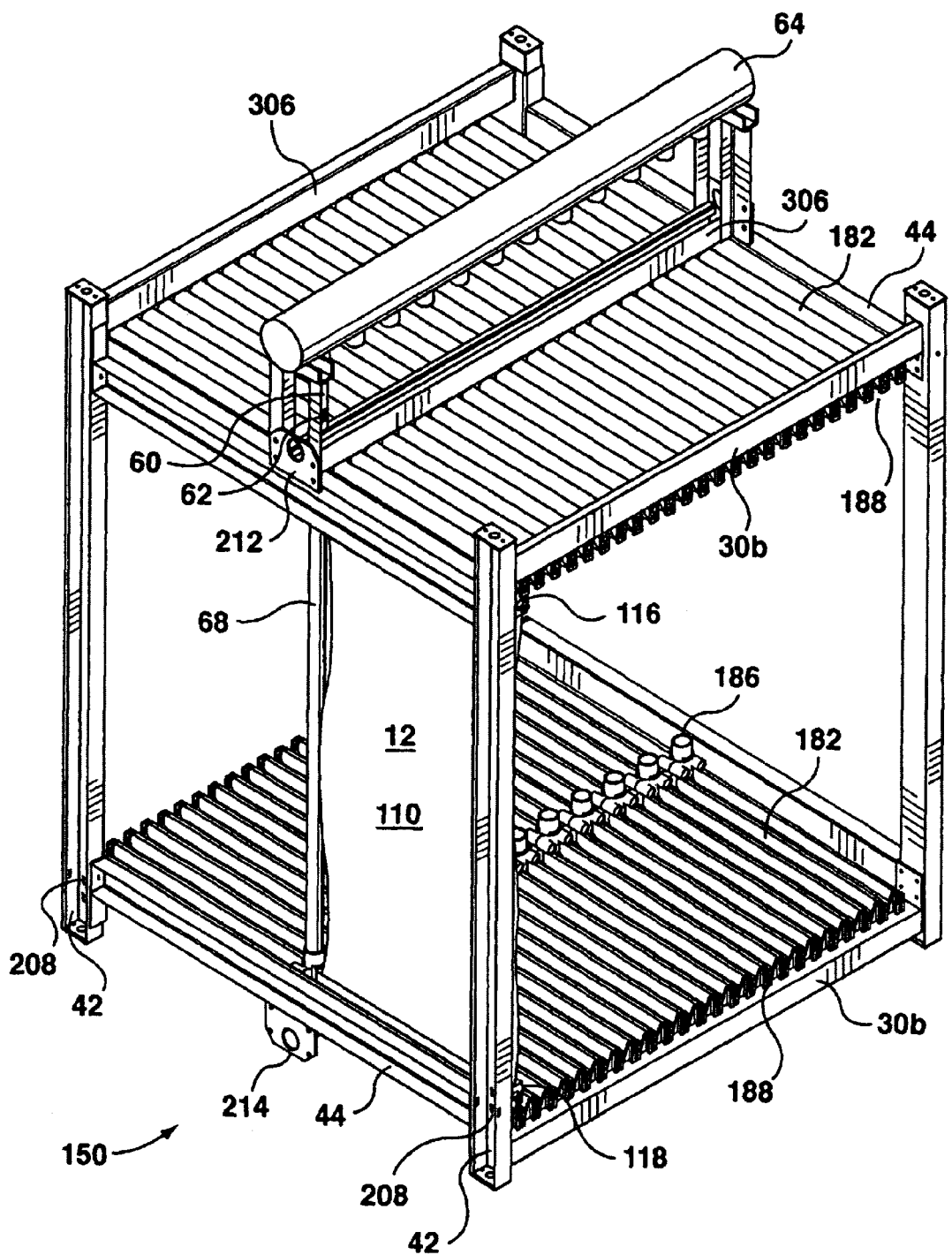
FIGS. 12, 13 and 14 are perspective, front and side views of a frame and parts of releasable attachments of the second embodiment.
Figure 13:
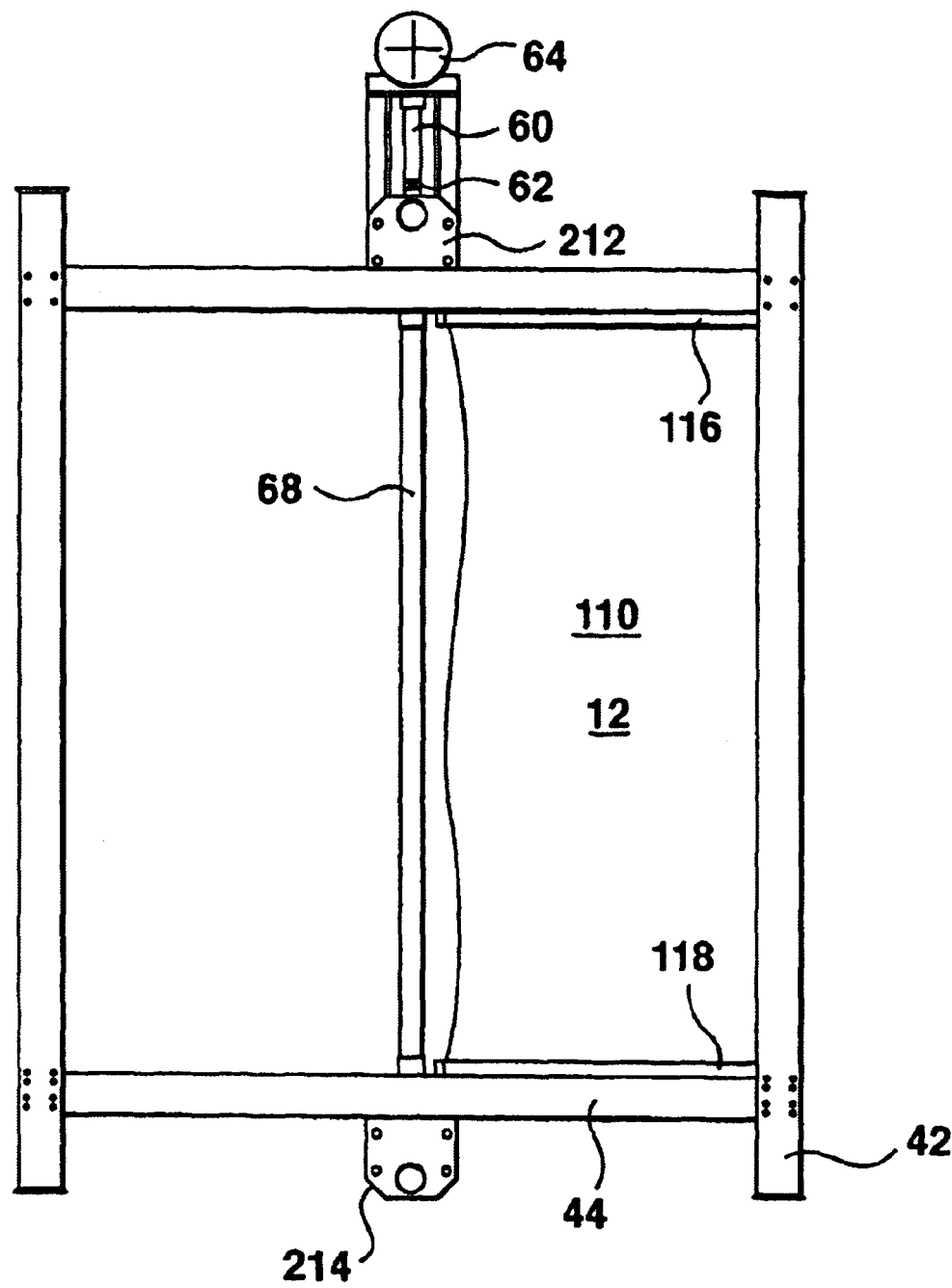
Figure 14:
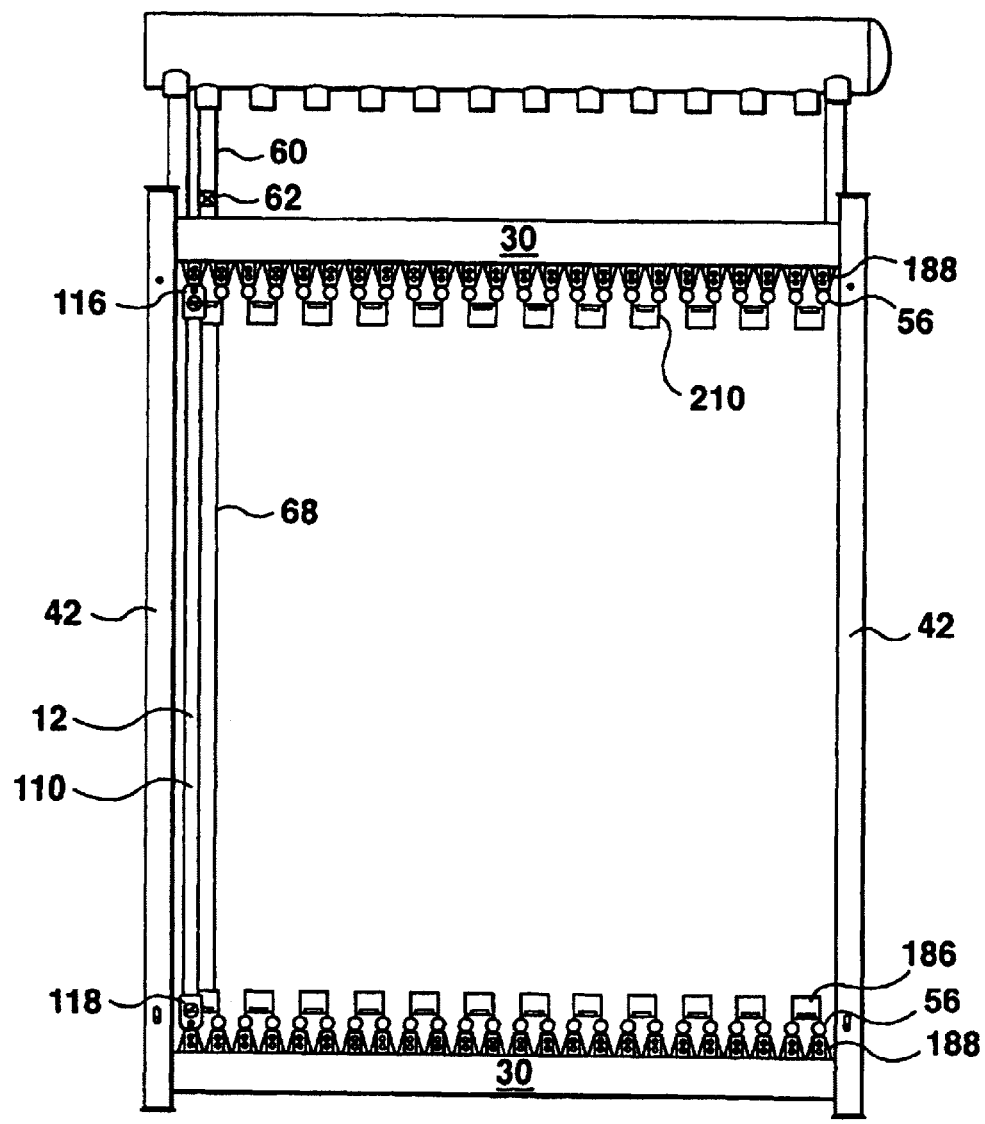

FIGS. 12 to 14 show a more fully assembled frame 40 forming part of a second cassette 150. A second assembly like that shown in FIG. 11 is inverted and placed over the assembly of FIG. 11. Uprights 42 hold the two assemblies together. The connection between the uprights 42 and one or both of the assemblies may be made though slots 208 which allow the distance between the two assemblies to be adjusted to fit the second elements 110. The distance between the two assemblies may also be adjusted after the membranes 12 have been used, for example, to account for shrinking. The upper track pieces 182 are held at the central cross bar 30a by flow through permeate stubs 210 which connect the local permeate pipe extensions 68 to local permeate pipes 60 which are in turn connected to a permeate collector 64 mounted to upper mounting tabs 212 at the top of the frame. Lower mounting tabs 214 at the bottom of the frame 40 may be used to mount an aerator grid below the second cassette 150. Only one of various components, such as second elements 110, local permeate pipe extensions 68, local permeate pipes 60 and isolation valves 62, are shown for clarity, but these components would be repeated across the second cassette 150. Also, although the second cassette 150 is shown as configured to collect permeate from second upper headers 116 and second lower headers 118, it may be adapted for use with permeating second upper headers 116 only by replacing the permeate pipe stubs 186 shown on the lower central cross bar 30a with locking clips 188 and replacing the flow through permeate stubs 210 shown at the upper central cross bar 30b with permeate pipe stubs 186. For use with permeating second lower headers 118 only, the female fittings 56 of the flow through permeate stubs 210 are plugged up or altered flow through permeate stubs not having female fittings 56 are provided.

A Third Embodiment

The following paragraphs describe a third embodiment, parts of which are shown in FIGS. 15 to 18. Although the description below may at times refer to specific figures, some components discussed may be shown only in others of FIGS. 15 to 19 or in figures discussed with other embodiments. The third embodiment is similar to the first and second embodiments in many respects. Aspects of the third embodiment that do not differ substantially from the first or second embodiment may not be described in the following paragraphs which will concentrate on the features of the third embodiment which differ from the first or second.

FIGS. 15A and 15B show a third element 310. The third element 310 has a third lower header 318 and a third upper header 316 which are similar to the second lower header 118 and second upper header 116. However, the third headers 316, 318 differ, for example, in having third keys 326, third back caps 324 and third front caps 325 unlike related components of the second headers 116, 118. The third element 310 shown has two permeating third headers 316, 318, but like previous elements may be made with either the third lower header 318 not a permeating header or the third upper header 316 not a permeating header.

Figure 16A:
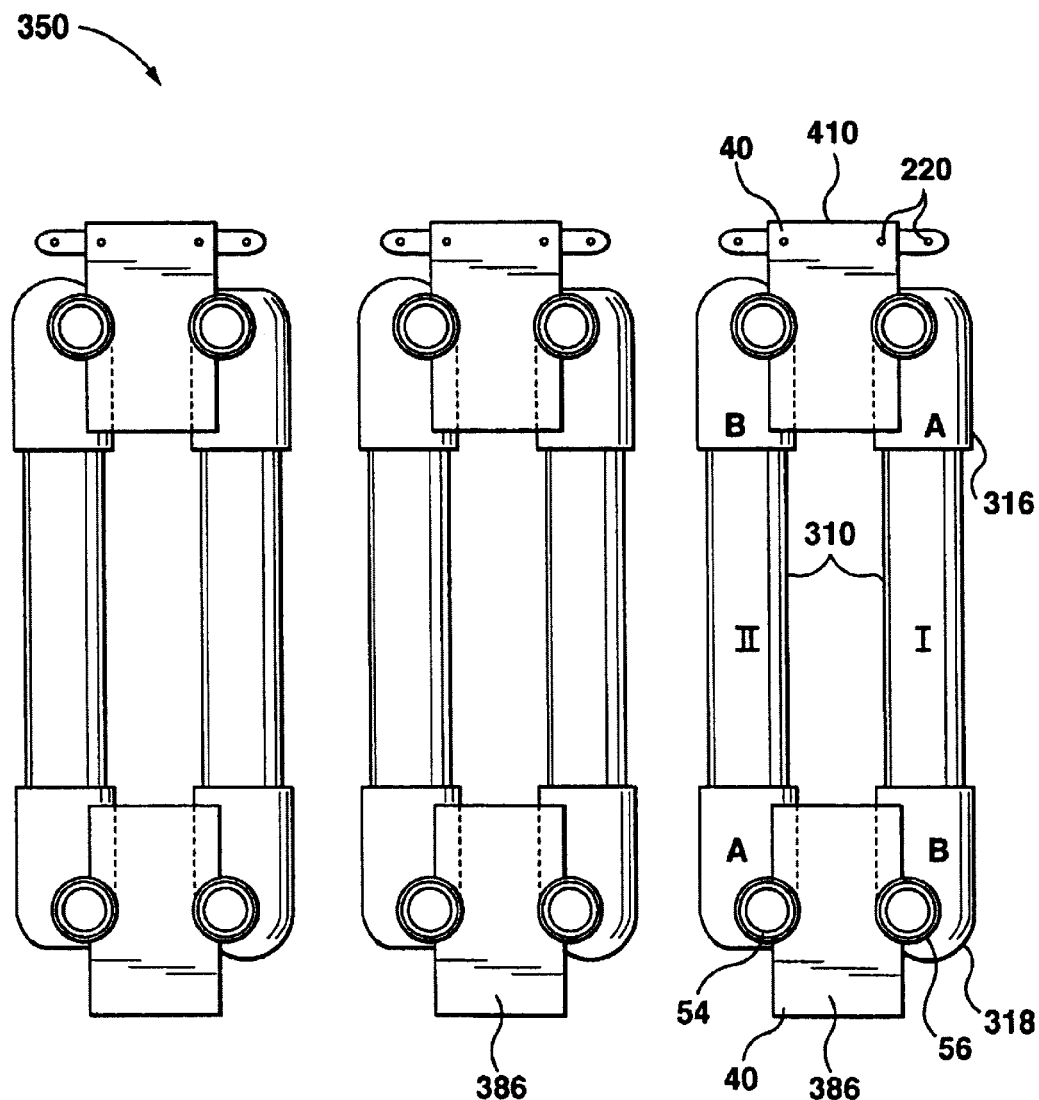
FIGS. 16A, 16B and 16C are schematic views of elements and permeate connections of a third embodiment.
Figure 16B:
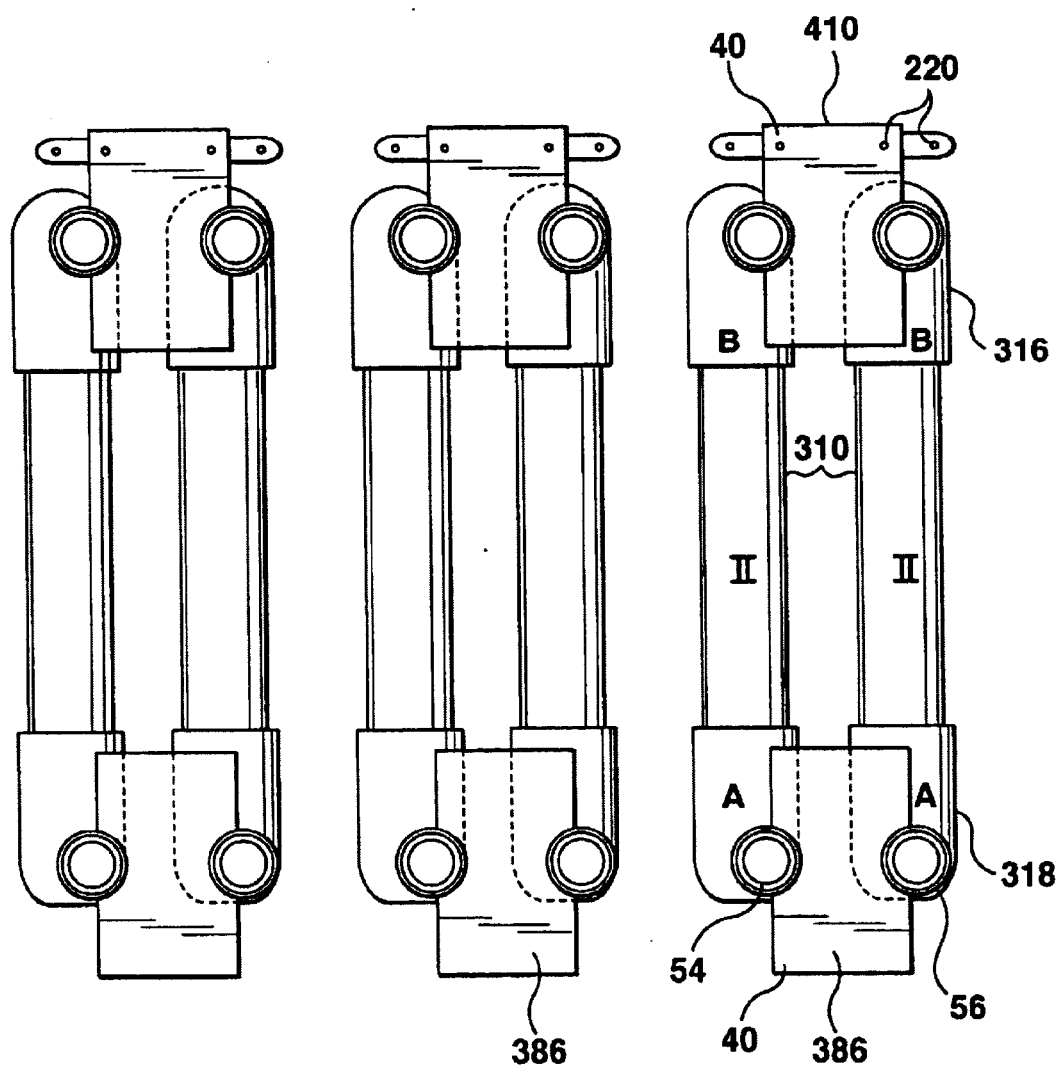
Figure 16C:
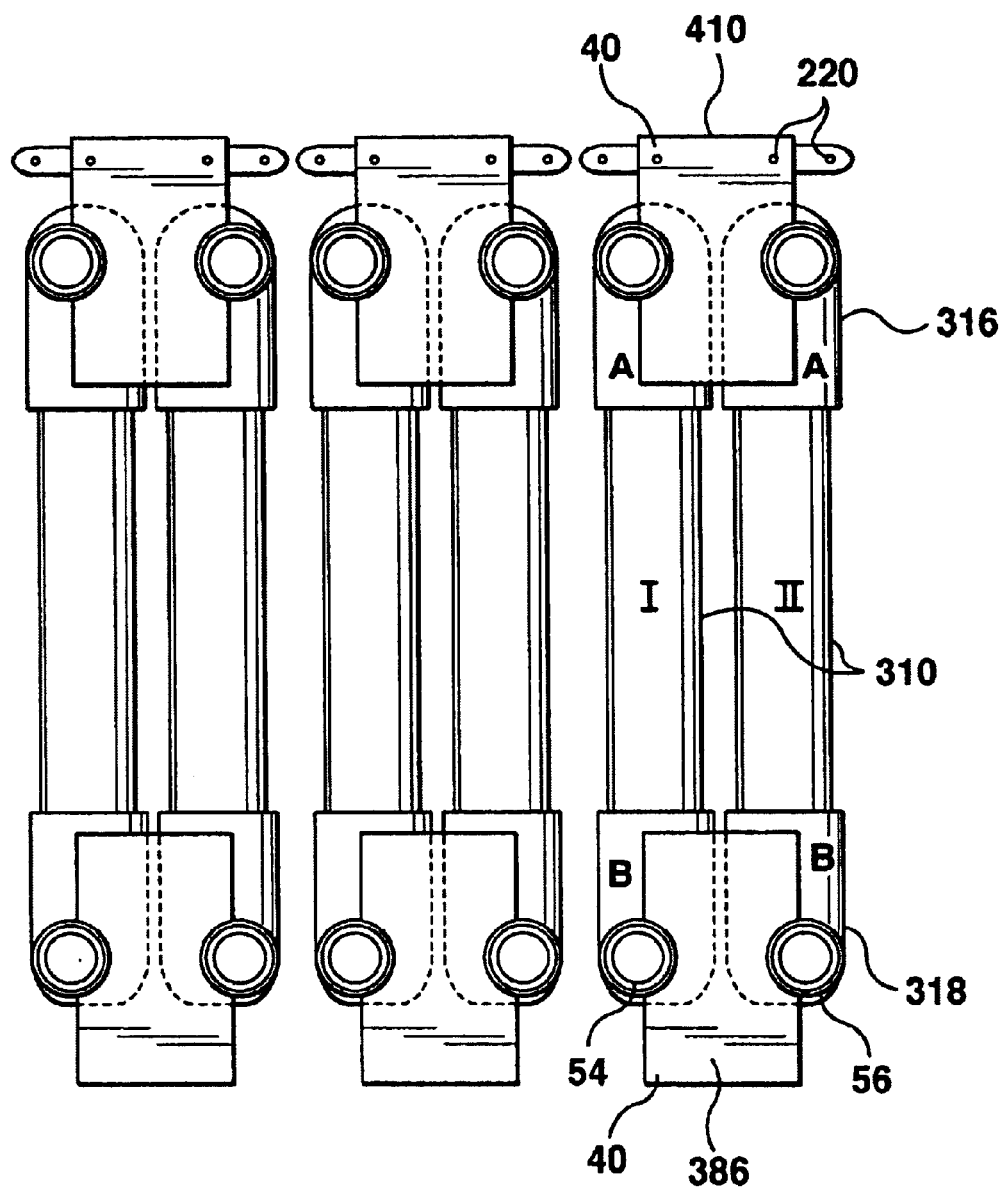

Referring to FIGS. 15B and 16A, B, C, the third headers 316, 318 have third back end caps 324 with male fittings 54 that are offset from the center of the third back end caps 324. Third back end caps 324A (shown schematically in FIGS. 16A, B, C as having truncated tops) have a male fittings 54 offset to one side of the center while third back end caps 324B (shown schematically in FIGS. 16A, B, C as having rounded tops) have a male fitting 54 offset to the other side of the center. By placing one of third back end cap 324A and one third back end cap 324B on the third headers 316, 318, third elements 310I and 310II can be made have male fittings 54 offset to opposite sides. If both of the third headers 316, 318 are permeating, then separate third elements 310I and 310II need not be made, as one will be an inverted version of the other. In conjunction with third permeate pipe stubs 386 having female fittings 56 on either side, a variable horizontal spacing between third elements 310I and 310II can be achieved with a single design of third permeate pipe stub 386 and without needing a third permeate pipe stub 386 for each third element 310. In particular, as shown in FIGS. 16A and 16C, swapping third element 310I for third element 310II (or turning each third element 310I or 310II over if both third headers 316, 318 are permeating) significantly alters the space between third elements 310I and 310II. By using third permeate pipe stubs 386 that can be mounted at various positions along a cross bar 30, two different spacings of all of the third elements 310 of a third cassette 350 can be achieved without requiring a separate local permeate pipe 60 and local permeate pipe extension 68 for each third element 310 and with only one small component, the third back caps 324, manufactured in two versions. The ability to have variable spacing is useful, for example, because a wider spacing can be chosen for wastewater applications and a narrower spacing chosen for drinking water filtration. As shown in FIG. 16B, an intermediate spacing may also be achieved by using a pair of third elements 310II. The same intermediate spacing may also be achieved by using a pair of third elements 310I.

The comments made in the paragraph above regarding the third permeate pipe stubs 386 similarly apply to third flow through permeate stubs 310. The third permeate stubs 310 also have a pair of mounting pins 220 on each side to support the end of the third track piece 382 (to be described below) at either spacing. Similar pairs of mounting pins 220 may also be provided on the third permeate pipe stubs 386 if they will also be used to support the ends of third track pieces 383, although this is optional as will be described further below.

Figure 17:
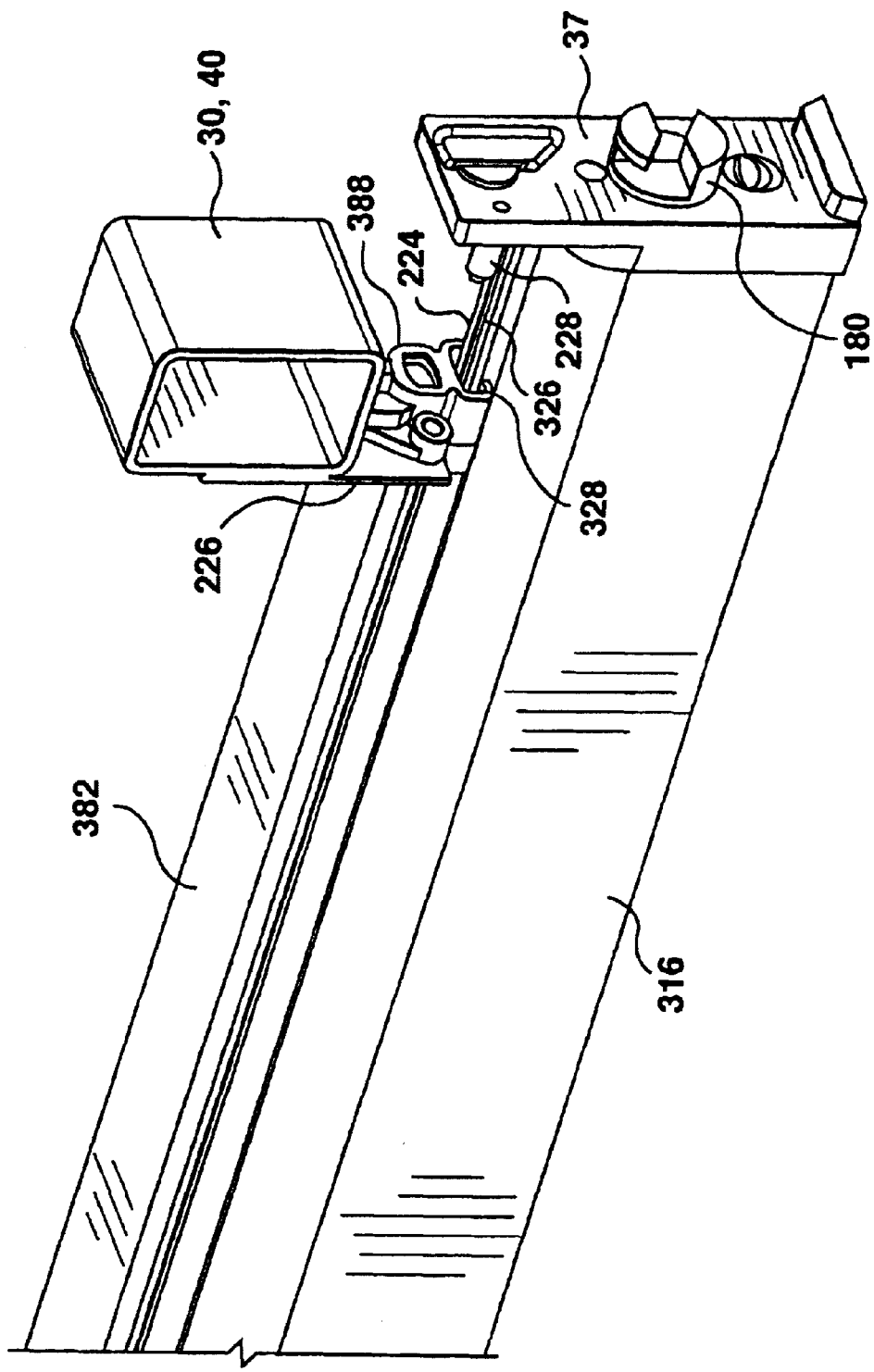
FIG. 17 is a perspective view of a header and parts of a releasable attachment of the third embodiment.

FIGS. 15B and 17 show a third key 326 that which has a key ridge 224. Although FIGS. 15B and 17 show only a third upper header 316, the third lower header 318 is the same, but is mounted in an inverted orientation. Similarly, other components of FIG. 17 may all be used in inverted orientation at the bottom of a third cassette 350. The key ridge 324 provides a line of contact between the distal surface of the third key 326 and the third track piece 382. Similarly, the edges of the third track piece 382 curl inwards to provide a line of contact with the proximal surfaces of the third key 326. These lines of contact are less prone to fouling than planes of contact.

FIG. 17 also shows the connection between one end of the third track pieces 382 and a cross bar 30. The connection between the other end of the third track piece 382 and the third permeate pipe stubs 386, or third flow through permeate stubs 310, was discussed above. The end shown in FIGS. 15B and 17 is supported on a pin (not visible) one a track mounting plate 226 mounted on a cross bar 30. The track mounting plate 226 also supports a third lock 388 that assists in keeping the third track piece 382 in position. The third lock 388 also mates with a twist knob 228 to allow the third upper header 316 to be releasably secured when it has been fully inserted into the third slot 328.

As an alternative to using an inverted version of the components shown in FIG. 17 to releasably attach the third lower header 318, FIGS. 18A and 18B show how the third lower header 318 may be Releasably attached to the frame 40 without using a third track piece 382. Referring to FIG. 18A, the third top header 316 (not shown) is partially inserted, for example between about one half to three quarters of the way, into the third track piece 382 (not shown). At this point, the third lower header 318 hangs from the membranes 12. The third lower header 318 is then pushed into its final position which is shown in FIG. 18B. Because the third upper header 316 was only partially inserted, the third lower header 318 arcs upwards slightly. Through trial and error or measurement and calculation, a position of the third upper header 316 can be determined at which the upward movement of the third lower header 318, despite the excess length of the membranes 12 required to produce slackened membranes 12 when the third element 310 is fully installed, allows the male fitting 54 to meet the female fitting 56 and allows the twist knob 228 to meet and be releasably connected to the third lock 388. The third upper header 318 is then fully inserted which restores the slack in the membranes 12. The twist knob 228 of the third upper header 316 is then engaged with the third lock 388 of the upper part of the frame 40.

The embodiments described above are examples of the invention only. Modifications and other embodiments within the scope of the invention will be apparent to those skilled in the art. The scope of the invention is defined by the following claims.

I claim:

1. An apparatus for filtering a liquid in a tank comprising,
   a) a plurality of elements, each having,
      (i) an upper header;
      (ii) a lower header;
      (iii) a plurality of hollow fibre membranes attached to and suspended between the headers, the membranes having each at least one open end and an outer surface, the outer surface of the open ends of the membranes connected to at least one header with a water impermeable connection; and,
      (iv) one or more permeate channels in at least one of the headers in fluid communication with the interior of the hollow fibre membranes for collecting permeate;
   b) a frame for holding the plurality of elements while the membranes are immersed in the liquid in the tank; and,
   c) releasable attachments between the headers of the elements and the frame allowing the frame to releasably hold the elements by their headers,
      wherein the size and configuration of the frame determines the positions of the upper headers of each element relative to the lower headers of each element.

2. The apparatus of claim 1 wherein (d) the frame holds the plurality of elements in a position such that the membranes are generally vertical when immersed in the liquid in the tank, (e) the frame allows tank water to rise generally vertically through the frame and past the elements.

3. The apparatus of claim 2 wherein the releasable attachments include a track and slider mechanism between the frame and the upper headers to allow the upper headers to be slid from the frame.

4. The apparatus of claim 3 wherein the track and slider mechanism is adapted to support the element whenever at least about one quarter of the upper header is inserted into the frame.

5. The apparatus of claim 3 wherein each element has an associated releasable and resealable water tight fitting between the element and a permeate collector, the releasable and resealable water tight fitting being releasable by moving the element in a direction substantially parallel to the headers of the element and resealable by moving the element in a reverse direction.

6. The apparatus of claim 3 wherein the releasable attachments include a track and slider mechanism between the frame and the lower headers to allow the lower headers to be slid from the frame.

7. The apparatus of claim 3 wherein the releasable attachments includes releasable supports on the frame which engage with the ends of the lower header when the lower header is swung into position while the upper header is supported in the track and slider mechanism.

8. The apparatus of claim 1 wherein the headers are elongated in shape and the frame holds the headers in a generally horizontal orientation when the membranes are immersed in the tank.

9. The apparatus of claim 1 wherein the releasable attachments between at least one end of the headers having a permeate channel and the frame are made through one or more permeate collection tubes.

10. The apparatus of claim 9 wherein the elements are attached to the frame in a back to back configuration separated by permeate collection tubes connected to the one or more permeate channels of the elements.

11. The apparatus of claim 1 wherein connections between the permeate channels and one or more permeate collection tubes attached to the frame are releasable and resealable connections which are made or broken automatically by the movements involved in attaching an element to the frame or removing an element from the frame.

12. The apparatus of claim 11 wherein pairs of headers are attached on either side of permeate collection tubes and fittings in communication with the permeate channels on one or more of the headers are offset from a centerline of the headers such that the pairs of headers may be installed at different horizontal spacings from each other.

13. A filtration apparatus comprising;
a) a plurality of elements, each element having,
an upper header;
a lower header;
a plurality of hollow fibre membranes attached to and suspended between the headers, the hollow fibre membranes having each an outer surface and at least one open end, the outer surface of the open ends of the membranes connected to at least one header with a water impermeable connection; and,
one or more permeate channels in at least one of the headers in fluid communication with the interior of the hollow fibre membranes for collecting permeate; and,
b) a frame for holding the headers of the elements such that the upper header of each element is spaced vertically in relation to the lower header of the element, the frame having cross bars and uprights,
wherein
either the upper headers or the lower headers are attached to cross bars that are movable relative to the uprights of the frame so as to permit adjustment of the degree of slack of the membranes to maintain the membranes in a sightly slackened state despite shrinkage of the membranes in use.

14. Two or more of the apparatus of any of claim 13 placed back to back with one or more permeate pipe between them and having fittings which permit an element of either cassette to be removed or replaced by sliding that element parallel to its headers whereby the fitting associated with that element is released or resealed.

15. The apparatus of claim 14 wherein the one or more permeate pipes includes a local permeate pipe associated with a small group of elements and fitted with a valve to isolate that group of elements, and a permeate collector connected to the local permeate pipes and located above water level at the height of larger permeate pipes around a tank.

16. A filtration apparatus comprising;
a) a plurality of elements, each element having,
an upper header;
a lower header;
a plurality of hollow fibre membranes attached to and suspended between the headers, the hollow fibre membranes having each an outer surface and at least one open end, the outer surface of the open ends of the membranes connected to at least one header with a water impermeable connection; and,
one or more permeate channels in at least one of the headers in fluid communication with the interior of the hollow fibre membranes for collecting permeate; and,
b) a frame having cross bars perpendicular to the headers for holding the headers of the elements,
wherein
c) the elements have keys which engage with slots in the cross bars to support the elements in the frame but permit the elements to be slid into or out of the frame in a direction parallel to the headers.

17. The apparatus of claim 16 wherein the elements themselves have no means for preventing one header of an element from moving vertically in relation to the other header of that element.

18. The apparatus of claim 16 wherein the elements have extensions at their backs to support themselves against adjacent elements while being inserted or removed from the frame, the extensions being arranged such that they do not interfere with the extensions of an adjacent element.

19. The apparatus of claim 18 wherein the headers are made of an extruded body closed with caps and the extensions are provided on the back cap.

* * * * *